(12) United States Patent
Mitasaki et al.

(10) Patent No.: US 11,042,771 B2
(45) Date of Patent: Jun. 22, 2021

(54) IMAGE EVALUATION DEVICE, IMAGE EVALUATION METHOD, AND IMAGE EVALUATION PROGRAM

(71) Applicant: NIPPON TELEGRAPH AND TELEPHONE CORPORATION, Tokyo (JP)

(72) Inventors: Tokinobu Mitasaki, Yokosuka (JP); Kazuya Hayase, Yokosuka (JP); Atsushi Shimizu, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 131 days.

(21) Appl. No.: 16/348,414

(22) PCT Filed: Nov. 8, 2017

(86) PCT No.: PCT/JP2017/040238
§ 371 (c)(1),
(2) Date: May 8, 2019

(87) PCT Pub. No.: WO2018/088425
PCT Pub. Date: May 17, 2018

(65) Prior Publication Data
US 2019/0272439 A1 Sep. 5, 2019

(30) Foreign Application Priority Data

Nov. 10, 2016 (JP) .............................. JP2016-219716
Nov. 18, 2016 (JP) .............................. JP2016-224922

(51) Int. Cl.
*G06K 9/00* (2006.01)
*H04N 11/02* (2006.01)
(Continued)

(52) U.S. Cl.
CPC ......... *G06K 9/4609* (2013.01); *G06K 9/3233* (2013.01); *G06T 7/0002* (2013.01);
(Continued)

(58) Field of Classification Search
USPC ........ 382/100, 103, 106–107, 154–155, 162, 382/172, 173, 181, 219, 254, 276, 305,
(Continued)

(56) References Cited

U.S. PATENT DOCUMENTS 9,386,322 B2 * 7/2016 Hayase ................... H04N 19/59
10,169,682 B2 * 1/2019 Nakagawa ......... G06K 9/00751
(Continued)

FOREIGN PATENT DOCUMENTS

EP 2048871 A1 4/2009
JP H09-050525 A 2/1997
(Continued)

OTHER PUBLICATIONS

Extended European Search Report from counterpart EP178699054, dated Apr. 20, 2020.
(Continued)

*Primary Examiner* — Seyed H Azarian
(74) *Attorney, Agent, or Firm* — Harness, Dickey & Pierce, P.L.C.

(57) ABSTRACT

An image evaluation device includes a determination result acquisition unit acquires a result of determining the presence or absence of a difference between an object image that is one of a plurality of images that include three or more images obtained by imaging substantially the same spatial region and each of reference images that are images other than the object image among the plurality of images and an evaluation index acquisition unit configured to acquire an evaluation index for the plurality of images on the basis of at least one of the number of determinations of the presence
(Continued)

of the difference between the object image and each reference image and the number of determinations of the absence of the difference between the object image and each reference image.

15 Claims, 17 Drawing Sheets

(51) Int. Cl.
| | | |
|---|---|---|
| *G06K 9/46* | (2006.01) | |
| *G06K 9/32* | (2006.01) | |
| *G06T 7/00* | (2017.01) | |
| *H04N 5/232* | (2006.01) | |
| *H04N 17/00* | (2006.01) | |
| *H04N 5/92* | (2006.01) | |
| *H04N 5/93* | (2006.01) | |

(52) U.S. Cl.
CPC ............... *H04N 5/232* (2013.01); *H04N 5/92* (2013.01); *H04N 5/93* (2013.01); *H04N 17/00* (2013.01)

(58) Field of Classification Search
USPC ... 382/312, 209; 375/240.2, 240.24, 240.12; 348/180
See application file for complete search history.

(56) References Cited

U.S. PATENT DOCUMENTS

| | | |
|---|---|---|
| 2003/0091235 A1 | 5/2003 | Xiong |
| 2007/0070199 A1 | 3/2007 | Kung |
| 2007/0139565 A1 | 6/2007 | Nishiuchi |
| 2009/0128633 A1* | 5/2009 | Chapman ............... H04N 19/87 348/180 |
| 2011/0274360 A1 | 11/2011 | Watanabe et al. |
| 2012/0133781 A1 | 5/2012 | Wang et al. |
| 2016/0057433 A1* | 2/2016 | Kudo ................... H04N 19/119 375/240.24 |
| 2016/0065990 A1* | 3/2016 | Shimizu ............... H04N 19/597 375/240.12 |
| 2017/0140251 A1 | 5/2017 | Nakagawa et al. |

FOREIGN PATENT DOCUMENTS

| | | |
|---|---|---|
| JP | 2007-195141 A | 8/2007 |
| JP | 2011-227915 A | 11/2011 |
| JP | 2011-237879 A | 11/2011 |
| JP | 4995787 B2 | 8/2012 |
| JP | 2014-086913 A | 5/2014 |
| JP | 2015-184760 A | 10/2015 |
| WO | WO-2015/146243 A1 | 10/2015 |

OTHER PUBLICATIONS

International Search Report (in English and Japanese) issued in PCT/JP2017/040238, dated Feb. 6, 2018; ISA/JP.

* cited by examiner

IMAGE EVALUATION DEVICE, IMAGE EVALUATION METHOD, AND IMAGE EVALUATION PROGRAM

CROSS-REFERENCE TO RELATED APPLICATIONS

This is application is a 371 of U.S. National State of International Application No. PCT/JP2017/040238, filed on Nov. 8, 2017, which claims priority to Japanese Application No. 2016-219716, filed on Nov. 10, 2016 and Japanese Application No. 2016-224922, filed on Nov. 18, 2016. The entire disclosures of the above applications are incorporated herein by reference.

TECHNICAL FIELD

The present invention relates to an image evaluation device, an image evaluation method, and an image evaluation program.

BACKGROUND ART

With an increase in a storage capacity of a hard disk drive or a semiconductor storage device, it is possible to store a large number of images (see Patent Document 1). Technology for detecting a difference between stored images has also been studied (see Patent Document 2). It is assumed that the number of inappropriate images or/and a proportion thereof also increases as the number of stored images increases and it is difficult to make appropriate evaluation based on the stored images. One of the reasons for difficulty in evaluating a plurality of stored images is that it is difficult to determine an evaluation index based on the plurality of stored images.

CITATION LIST

Patent Literature

[Patent Document 1]
  Japanese Unexamined Patent Application, First Publication No. 2014-86913
[Patent Document 2]
  Japanese Patent No. 4995787

SUMMARY OF INVENTION

Technical Problem

In view of the above-described circumstances, an objective of the present invention is to provide an image evaluation device, an image evaluation method, and an image evaluation program capable of obtaining an evaluation index based on qualities of a plurality of images that are stored.

Solution to Problem

According to a first aspect of the present invention, there is provided an image evaluation device, including: a determination result acquisition unit configured to acquire a determination result of determining the presence or absence of a difference between an object image that is one of a plurality of images that include three or more images obtained by imaging substantially the same spatial region and each of reference images that are images other than the object image among the plurality of images; and an evaluation index acquisition unit configured to acquire an evaluation index for the plurality of images on the basis of at least one of the number of determinations of the presence of the difference between the object image and each reference image and the number of determinations of the absence of the difference between the object image and each reference image.

According to a second aspect of the present invention, in the image evaluation device according to the above-described first aspect, the plurality of images are time-series images, the determination result acquired by the determination result acquisition unit indicates the presence or absence of a difference between a small image of a region within the object image and a small image of a region within the reference image, and the evaluation index acquisition unit is configured to obtain a result of determining the number of sets of regions determined to have a difference between small images among each pair of a region within the object image and a region within each image of the time-series images other than the object image as the evaluation index.

According to a third aspect of the present invention, in the image evaluation device according to the above-described second aspect, if a probability that the presence or absence of a difference between the small images is erroneously determined is less than a first threshold value, the evaluation index acquisition unit is configured to obtain a value indicating a priority for evaluating the difference as the evaluation index.

According to a fourth aspect of the present invention, in the image evaluation device according to the above-described second aspect, if a probability that the presence or absence of a difference between the small images is erroneously determined is greater than or equal to a first threshold value, the evaluation index acquisition unit is configured to obtain a value indicating accuracy of a result of determining that the difference between the small images is present as the evaluation index.

According to a fifth aspect of the present invention, the image evaluation device according to the above-described third or fourth aspect further includes a binarization unit configured to obtain a binary evaluation index indicating the presence or absence of the difference between the small images on the basis of a result of comparing a value according to the evaluation index with a second threshold value.

According to a sixth aspect of the present invention, the image evaluation device according to any one of the above-described second to fifth aspects further includes a difference determination unit configured to determine the presence or absence of the difference between the small image of the region within the object image and the small image of the region within the reference image and obtain the determination result.

According to a seventh aspect of the present invention, the image evaluation device according to any one of the above-described second to sixth aspects further includes an image processing unit configured to enlarge the small image of the region within the object image on the basis of the evaluation index obtained for each region within the object image.

According to an eighth aspect of the present invention, in the image evaluation device according to the above-described first aspect, the evaluation index acquisition unit is configured to sort the plurality of images into images that satisfy a quality standard related to the spatial region and images that do not satisfy the quality standard on the basis of the evaluation index.

According to a ninth aspect of the present invention, in the image evaluation device according to the above-described eighth aspect, the evaluation index acquisition unit is configured to acquire a ratio of the number of reference images determined to have differences from the object image to the total number of reference images among the plurality of images as the evaluation index.

According to a tenth aspect of the present invention, in the image evaluation device according to the above-described eighth aspect, the evaluation index acquisition unit is configured to acquire as the evaluation index either one of: a ratio of a total area of small images of regions within the reference images determined to have differences from small images of regions within the object image to a total area of the reference images among the plurality of images, and a ratio of the number of regions within the reference images including the small images determined to have the differences from the small images of the regions within the object image to the total number of regions within the reference images among the plurality of images.

According to an eleventh aspect of the present invention, the image evaluation device according to the above-described ninth or tenth aspect further includes a removal unit configured to remove the object image that does not satisfy the quality standard from the plurality of images on the basis of a magnitude relationship between the evaluation index and a threshold value.

According to a twelfth aspect of the present invention, the image evaluation device according to any one of the above-described eighth to eleventh aspects further includes a difference determination unit configured to determine the presence or absence of the difference between the object image and each reference image.

According to a thirteenth aspect of the present invention, in the image evaluation device according to the above-described twelfth aspect, the difference determination unit is configured to determine the reference image determined to have the difference from the object image in an area having a fixed proportion or more with respect to an area of the reference image as the reference image having the difference from the object image.

According to a fourteenth aspect of the present invention, in the image evaluation device according to the above-described twelfth or thirteenth aspect, the difference determination unit is configured to add another image determined not to have a difference from an image selected from the plurality of images in the plurality of images.

According to a fifteenth aspect of the present invention, there is provided an image evaluation method, including the steps of: acquiring a result of determining the presence or absence of a difference between an object image that is one of a plurality of images that include three or more images obtained by imaging substantially the same spatial region and each of reference images that are images other than the object image among the plurality of images; and acquiring an evaluation index for the plurality of images on the basis of at least one of the number of determinations of the presence of the difference between the object image and each reference image and the number of determinations of the absence of the difference between the object image and each reference image.

According to a sixteenth aspect of the present invention, there is provided an image evaluation program for causing a computer provided in an image evaluation device to function as: a determination result acquisition unit configured to acquire a result of determining the presence or absence of a difference between an object image that is one of a plurality of images that include three or more images obtained by imaging substantially the same spatial region and each of reference images that are images other than the object image among the plurality of images; and an evaluation index acquisition unit configured to acquire an evaluation index for the plurality of images on the basis of at least one of the number of determinations of the presence of the difference between the object image and each reference image and the number of determinations of the absence of the difference between the object image and each reference image.

Advantageous Effects of Invention

According to the present invention, it is possible to obtain an evaluation index based on qualities of a plurality of images that are stored.

DESCRIPTION OF EMBODIMENTS

Embodiments related to an image evaluation device, an image evaluation method, and an image evaluation program of the present invention will be described in detail with reference to the drawings.

First Embodiment

Figure 1:
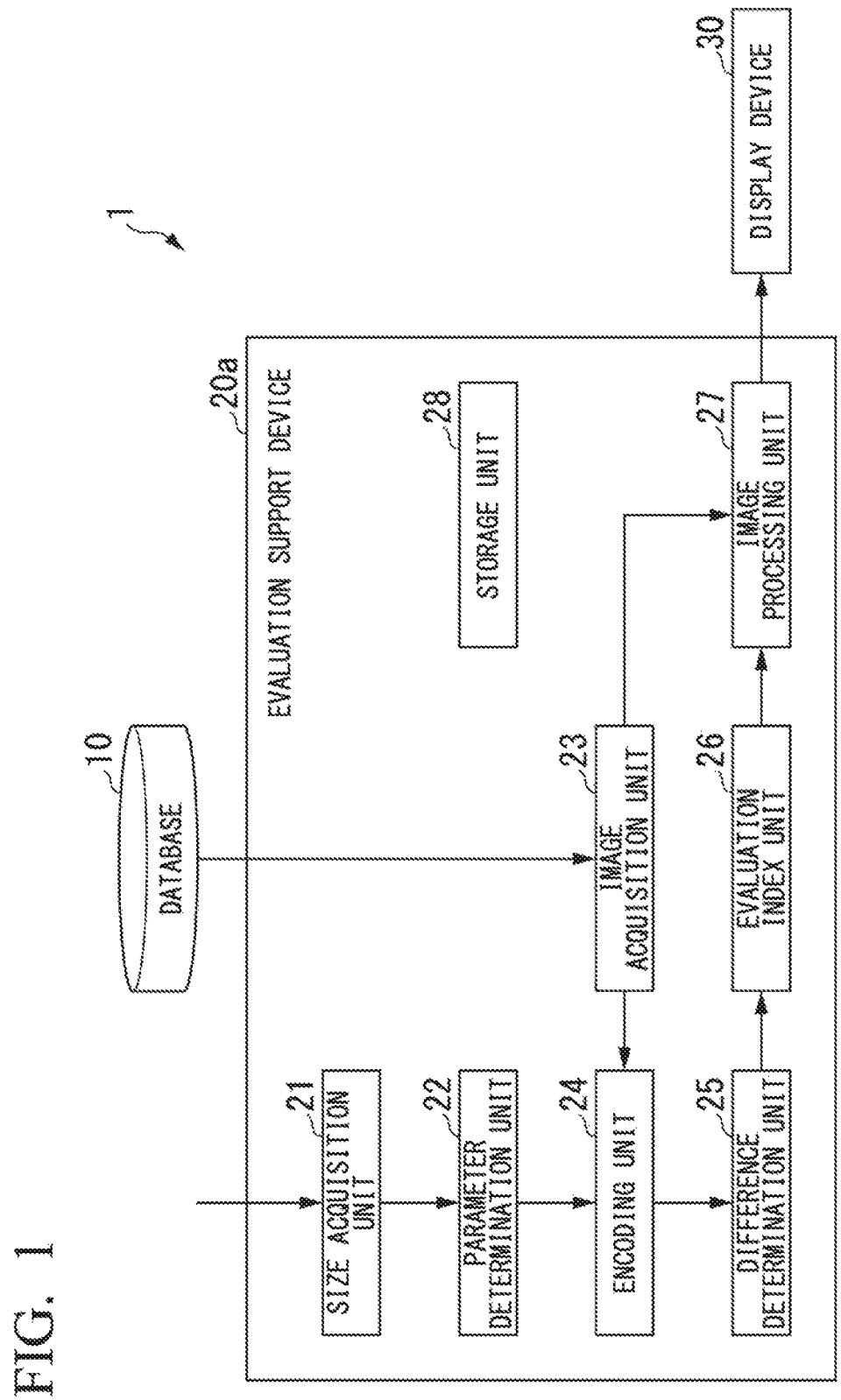
FIG. 1 is a diagram showing an example of a configuration of an evaluation support system according to a first embodiment.

FIG. 1 is a diagram showing an example of a configuration of an evaluation support system 1. The evaluation support system 1 is a system configured to support a determination of a user who evaluates a difference between images. The evaluation support system 1 includes a database 10, an evaluation support device 20a, and a display device 30.

The database 10 includes a storage device having a nonvolatile recording medium (a non-transitory recording medium) such as a magnetic hard disk device or a semiconductor storage device. The database 10 stores time-series images. Hereinafter, substantially the same spatial region is imaged in time-series images. The time-series images may be captured in a direction differing according to each image if substantially the same spatial region is imaged. In addition, scales of the time-series images may differ according to each image if substantially the same spatial region is imaged. The images are, for example, medical images, monitoring images, aerial images, or satellite images. The satellite images are obtained by imaging, for example, substantially the same region on a ground surface from an artificial satellite at a frequency of about once per day.

Hereinafter, the image is an image that satisfies a predetermined quality standard desired by the user (a clear image). For example, the quality standard means that a spatial region having a fixed area or more among spatial regions of an imaging object is imaged. When the image is an aerial image or a satellite image, the quality standard means that a region on a ground surface having a fixed area or more is imaged without being hidden by clouds or fog. For example, an imaging object may be a subject in which the presence or absence of a change is desired to be detected. An image in which the spatial region of the imaging object or the imaging object is imaged may be an image in which a subject whose the presence or absence of a change is desired to be detected is imaged.

As another example, the quality standard may mean the ease of detection of a change in the imaging object between stored images. For example, a ratio of an area in which the imaging object appears to an area of an image may be used as the quality standard. It may be determined that the image satisfies the quality standard when the ratio of the area in which the imaging object appears in the image without being hidden by another subject is greater than or equal to a predetermined value. Furthermore, if the imaging object appears clearly in the image, it may be determined that the image satisfies the quality standard. That is, the quality standard may be defined with respect to the imaging object or the spatial region of the imaging object.

The image includes a plurality of regions (blocks). The shape of the region within the image is, for example, a rectangle. The region within the image is defined in an image in a unit of, for example, a macro block (MB) of the Moving Picture Experts Group (MPEG) or the like, a coding unit (CU) of high efficiency video coding (HEVC) or the like, a largest CU (LCU), a prediction unit (PU), or a transform unit (TU). Hereinafter, a case in which the region is defined in an image in a unit for the largest coding unit will be described.

The evaluation support device 20a serving as an image evaluation device supports a determination of a user who evaluates a difference between images. The evaluation support device 20a acquires time-series images including a region where the user evaluates a difference from the database 10. The evaluation support device 20a determines the presence or absence of a difference between time-series images for each region within the image.

The evaluation support device 20a assigns an evaluation index for allowing a user to determine a region for which a difference between time-series images is preferentially evaluated to the region within the image on the basis of a determination result indicating the presence or absence of the difference for each region. The evaluation support device 20a transmits the evaluation index assigned to the region to the display device. The evaluation support device 20a may perform image processing on the image on the basis of the evaluation index. The evaluation support device 20a transmits the image on which the image processing has been performed to the display device 30.

The display device 30 includes a screen having a liquid crystal display or a light-emitting diode (LED). The display device 30 displays the evaluation index assigned to a region on the screen. The display device 30 displays an image on which image processing has been performed by the evaluation support device 20a on the screen. Thereby, the user can evaluate a difference between images for each region within the image on the basis of the image and the evaluation index displayed on the screen.

The display device 30 may include an operation device such as a touch panel provided on the screen. The display device 30 may transmit a signal according to an operation received by the operation device such as the touch panel to the evaluation support device 20a.

A configuration of the evaluation support device 20a will be described.

The evaluation support device 20a includes a size acquisition unit 21, a parameter determination unit 22, an image acquisition unit 23, a encoding unit 24, a difference determination unit 25, an evaluation index unit 26, an image processing unit 27, and a storage unit 28.

For example, some or all of the size acquisition unit 21, the parameter determination unit 22, the image acquisition unit 23, the encoding unit 24, the difference determination unit 25, the evaluation index unit 26, and the image processing unit 27 may be implemented by a processor such as a central processing unit (CPU) executing a program stored in the storage unit 28 or implemented by using hardware such as large scale integration circuit (LSI) or an application specific integrated circuit (ASIC).

The size acquisition unit 21 externally acquires information indicating a size of a difference in a determination object (hereinafter referred to as a "determination size") on an image (hereinafter referred to as "determination size information"). Hereinafter, a size of a largest coding unit (LCU) is used as the determination size. For example, the determination size is represented using the number of pixels. The size acquisition unit 21 transmits the determination size information to the parameter determination unit 22.

The parameter determination unit 22 at least determines the size of the largest coding unit (hereinafter referred to as a "encoding size") on the basis of the determination size. The parameter determination unit 22 transmits encoding parameters including information indicating the encoding size and the like to the encoding unit 24.

The image acquisition unit 23 acquires time-series images in which the user evaluates a difference for each region from the database 10. The image acquisition unit 23 acquires time-series images including three or more images. As an example, the image acquisition unit 23 acquires four images from a first image to a fourth image. Hereinafter, the first image is an image captured at a latest clock time. The second image is an image captured at the next latest clock time after the first image. The third image is an image captured at the next latest clock time after the second image. The fourth image is an image captured at an earliest clock time. The image acquisition unit 23 transmits the time-series images to the encoding unit 24 and the image processing unit 27.

The encoding unit 24 encodes the time-series images. For example, the encoding unit 24 may execute H.264/advanced video coding (AVC), HEVC, a moving-image coding process of MPEG or the like on the basis of encoding parameters. The encoding unit 24 may execute a still-image coding process of JPEG or the like on the basis of encoding parameters.

Hereinafter, a plurality of reference images among the time-series images are the second image, the third image, and the fourth image. An image of an object for which it is determined whether or not there is a difference from the reference images is the first image (hereinafter referred to as an "object image"). The object image and the reference images among the time-series images are sorted, for example, by the image acquisition unit 23, on the basis of predetermined conditions. The time-series images may be divided into the object image and the reference images and stored in the database 10.

The encoding unit 24 encodes the object image and the reference images on the basis of a determination size. If a moving-image coding process of HEVC is executed, the encoding unit 24 performs an HEVC intra-coding process based on the determination size on the object image and the reference images.

Hereinafter, a largest coding unit within the object image is referred to as an "object LCU". Hereinafter, a largest coding unit adjacent to the object LCU in the object image is referred to as an "adjacent LCU". Hereinafter, a largest coding unit spatially having substantially the same position as the object LCU in the reference image is referred to as a "same position LCU". Hereinafter, an image within a region is referred to as a "small image of a region".

The difference determination unit 25 determines the presence or absence of a difference between a small image of a region of the object LCU and a small image of a region of an adjacent LCU on the basis of a difference between encoding information of the small image of the region of the object LCU and encoding information of the small image of the region of the adjacent LCU. For example, the difference determination unit 25 determines the presence or absence of the difference between the small image of the region of the object LCU and the small image of the region of the adjacent LCU on the basis of a difference between the amount of coding bits of the region of the object LCU and the amount of coding bits of the region of the adjacent LCU.

If there is a difference between the small image of the region of the object LCU and the small image of the region of the adjacent LCU, the difference determination unit 25 further determines the presence or absence of a difference between the small image of the region of the object LCU and the small image of the region of the same position LCU.

The difference determination unit 25 determines the presence or absence of the difference between the small image of the region of the object LCU and the small image of the region of the same position LCU on the basis of a difference between encoding information of the small image of the region of the object LCU and encoding information of the small image of the region of the same position LCU. For example, the difference determination unit 25 determines the presence or absence of the difference between the small image of the region of the object LCU and the small image of the region of the adjacent position LCU on the basis of a difference between the amount of coding bits of the small image of the region of the object LCU and the amount of coding bits of the small image of the region of the same position LCU.

A method in which the difference determination unit 25 determines the presence or absence of the difference between the object image and the reference image is not limited to a specific method. Hereinafter, a method in which the difference determination unit 25 determines the presence or absence of differences between small images on the basis of the amount of coding bits in the coding process will be described as an example.

The difference determination unit 25 compares the amount of coding bits of the region of the object LCU with the amount of coding bits of regions of adjacent LCUs on the top, bottom, left and right of the region of the object LCU. For example, the difference determination unit 25 determines whether or not a relationship between the amount of coding bits of the region of the object LCU and the amount of coding bits of the region of the adjacent LCU satisfies any one of the following first to eighth conditions.

First condition: max (R(N−1)/R(N), R(N)/R(N−1))> R_Th1

Second condition: max (R(N+1)/R(N), R(N)/R(N+1))> R_Th1

Third condition: max (R(N−x)/R(N), R(N)/R(N−x))> R_Th1

Fourth condition: max (R(N+x)/R(N), R(N)/R(N+x))> R_Th1

Fifth condition: min (R(N−1)/R(N), R(N)/R(N−1))< R_Th2

Sixth condition: min (R(N+1)/R(N), R(N)/R(N+1))< R_Th2

Seventh condition: min (R(N−x)/R(N), R(N)/R(N−x))< R_Th2

Eighth condition: min (R(N+x)/R(N), R(N)/R(N+x))< R_Th2

Here, the term "R" denotes the amount of coding bits of the region of the largest coding unit. The term "max (R(N−1), R(N))" represents a larger value between the amount of coding bits R(N−1) and R(N). The term "min (R(N−1), R(N))" represents a smaller value between the amount of coding bits R(N−1) and R(N). The term "R_Th1" is a threshold value of the amount of coding bits that satisfies R_Th1>1. The term "R_Th2" is a threshold value of the amount of coding bits that satisfies 0<R_Th2≤1. The term "N" denotes an $N^{th}$ object LCU within the object image. The term "N−1" denotes the adjacent LCU on the left of the object LCU. The term "N+1" denotes the adjacent LCU on the right of the object LCU. The term "N−x" denotes the adjacent LCU on the top of the object LCU. The term "N+x" denotes the adjacent LCU on the bottom of the object LCU.

If the relationship between the amount of coding bits of the region of the object LCU and the amount of coding bits of the region of the adjacent LCU does not satisfy all of the first to eighth conditions, the difference determination unit 25 determines that there is no difference between the small image of the region of the object LCU and the small image of the region of the adjacent LCU. That is, if the difference between the amount of coding bits of the region of the object LCU and the amount of coding bits of the region of the adjacent LCU is small, the difference determination unit 25 determines that there is no difference between the small image of the region of the object LCU and the small image of the region of the adjacent LCU. The difference determination unit 25 records a result of determining that there is no difference between the small image of the region of the object LCU and the small image of the region of the adjacent LCU in the storage unit 28 in association with the region of the object LCU.

If the relationship between the amount of coding bits of the region of the object LCU and the amount of coding bits of the region of the adjacent LCU satisfies any one of the first to eighth conditions, the difference determination unit 25 compares the amount of coding bits of the region of the object LCU with the amount of coding bits of the region of the same position LCU. For example, the difference determination unit 25 determines whether or not the relationship between the amount of coding bits of the region of the object LCU and the amount of coding bits of the region of the same position LCU satisfies the following ninth or tenth condition.

Ninth condition: max (R_A(N)/R_B(N), R_B(N)/R_A(N))>R_Th3

Tenth condition: min (R_A(N)/R_B(N), R_B(N)/R_A(N))<R_Th4

Here, the term "R_A" denotes the amount of coding bits of a region of the same position LCU within a reference image "A". The term "R_B" denotes the amount of coding bits of a region of an object LCU within an object image "B". The term "R_Th3" is a threshold value of the amount of coding bits that satisfies R_Th3>1. The term "R_Th4" is a threshold value of the amount of coding bits that satisfies 0<R_Th4<1.

If the relationship between the amount of coding bits of the region of the object LCU and the amount of coding bits of the region of the same position LCU does not satisfy both the ninth condition and the tenth condition, the difference determination unit 25 determines that there is no difference between the small image of the region of the object LCU and the small image of the region of the same position LCU. That is, if the difference between the amount of coding bits of the region of the object LCU and the amount of coding bits of the region of the same position LCU is small, the difference determination unit 25 determines that there is no difference between the small image of the region of the object LCU and the small image of the region of the same position LCU. The difference determination unit 25 records a result of determining that there is no difference between the small image of the region of the object LCU and the small image of the region of the same position LCU in the storage unit 28 in association with the region of the object LCU.

If the relationship between the amount of coding bits of the region of the object LCU and the amount of coding bits of the region of the same position LCU satisfies the ninth condition or the tenth condition, the difference determination unit 25 determines that there is a difference between the small image of the region of the object LCU and the small image of the region of the same position LCU. That is, if a difference between the amount of coding bits of the region of the object LCU and the amount of coding bits of the region of the same position LCU is large, the difference determination unit 25 determines that there is a difference between the small image of the region of the object LCU and the small image of the region of the same position LCU. The difference determination unit 25 records a determination result indicating that it is determined that there is a difference between the small image of the region of the object LCU and the small image of the region of the same position LCU in the storage unit 28 in association with the region of the object LCU.

If the encoding unit 24 executes a moving-image coding process of HEVC, the difference determination unit 25 may calculate a result of determining the presence or absence of differences between small images when encoding has been performed by shifting an encoding start point defined at an upper left end of an image. The difference determination unit 25 may determine a result of combining a determination result when encoding has been performed without shifting an encoding start point and a determination result when encoding has been performed by shifting the encoding start point (a logical OR result) as a final determination result.

Figure 2:
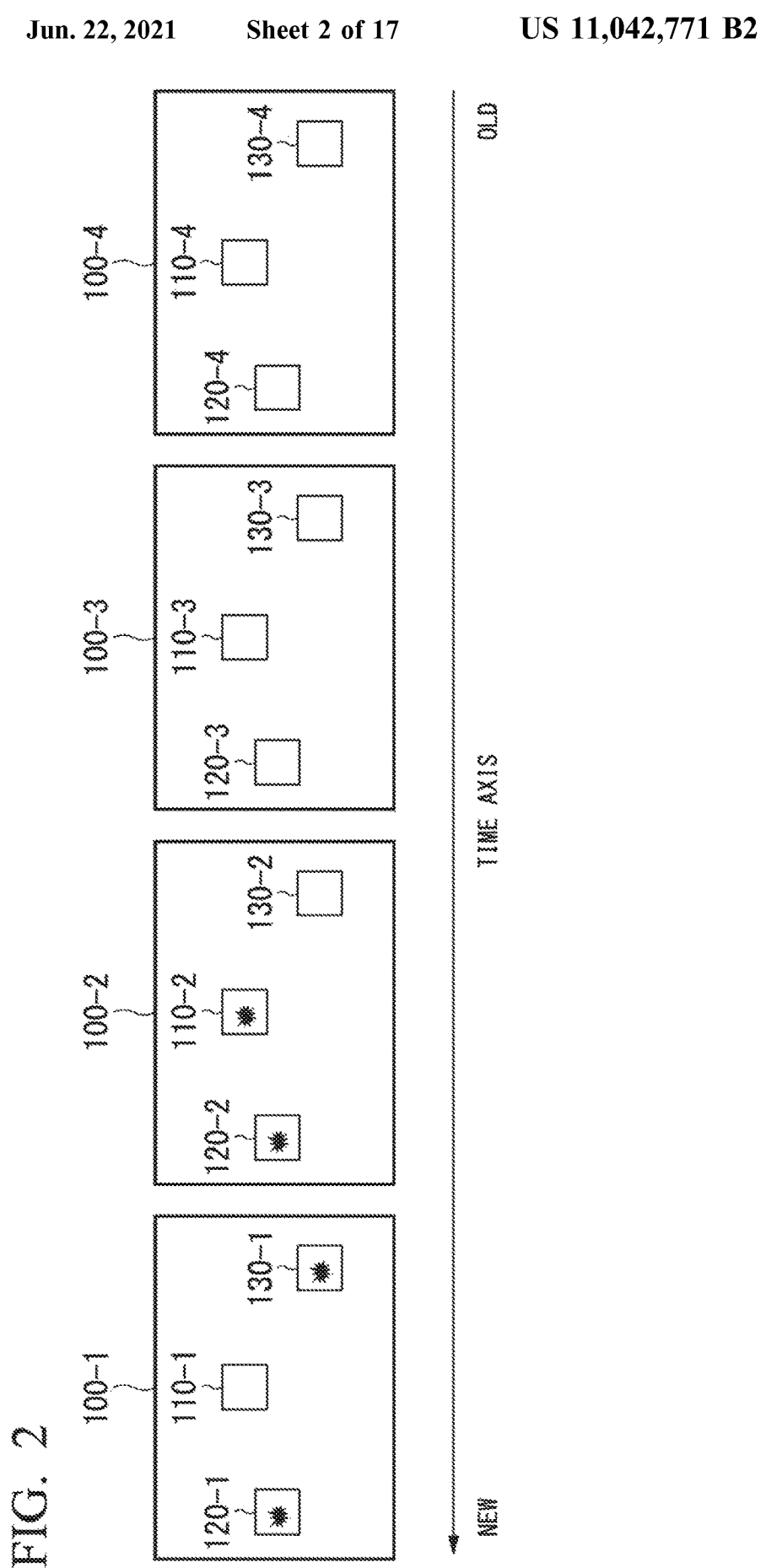
FIG. 2 is a diagram showing an example of time-series images according to the first embodiment.

FIG. 2 is a diagram showing an example of time-series images. In FIG. 2, an image 100-1 is an object image captured at a latest clock time. An image 100-2 is a reference image captured at the next latest clock time after the image 100-1. An image 100-3 is a reference image captured at the next latest clock time after the image 100-2. An image 100-4 is a reference image captured at an earliest clock time.

Hereinafter, with respect to items common to the images 100-1 to 100-4, the images 100-1 to 100-4 are represented as "images 100" by omitting a part of a reference sign. In the images 100, for example, a region 110, a region 120, and a region 130 are defined.

In the example shown in FIG. 2, the difference determination unit 25 determines that there is a difference between the small image of the region 110-1 of the object LCU and the small image of the region 110-2 of the same position LCU. The difference determination unit 25 determines that there is no difference between the small image of the region 110-1 of the object LCU and the small image of the region 110-3 of the same position LCU. The difference determination unit 25 determines that there is no difference between the small image of the region 110-1 of the object LCU and the small image of the region 110-4 of the same position LCU.

In the example shown in FIG. 2, the difference determination unit 25 determines that there is no difference between the small image of the region 120-1 of the object LCU and the small image of the region 120-2 of the same position LCU. The difference determination unit 25 determines that there is a difference between the small image of the region 120-1 of the object LCU and the small image of the region 120-3 of the same position LCU. The difference determination unit 25 that there is a difference between the small image of the region 120-1 of the object LCU and the small image of the region 120-4 of the same position LCU.

In the example shown in FIG. 2, the difference determination unit 25 determines that there is a difference between the small image of the region 130-1 of the object LCU and the small image of the region 130-2 of the same position LCU. The difference determination unit 25 determines that there is a difference between the small image of the region 130-1 of the object LCU and the small image of the region 130-3 of the same position LCU. The difference determination unit 25 determines that there is a difference between the small image of the region 130-1 of the object LCU and the small image of the region 130-4 of the same position LCU.

Returning to FIG. 1, description of a configuration of the evaluation support device 20a will be continued. The evaluation index unit 26 serving as the evaluation index acquisition unit assigns to a region of the object LCU an evaluation index for allowing a user to determine a region for which a difference between the object image and the reference image is preferentially evaluated among regions of a plurality of object LCUs on the basis of a determination result indicating the presence or absence of differences between small images.

The evaluation index unit 26 acquires the determination result of the presence or absence of the difference between the small images from the encoding unit 24 or the storage unit 28. The evaluation index unit 26 determines the number of pairs of regions determined to have a difference between small images thereof among each pair of a region of the object LCU and a region of every same position LCU (the number of pairs having changes) for each region of the object LCU within the object image for the image 100-1 and two or more reference images.

In the example shown in FIG. 2, it is determined that there is a difference between the small image of the region 110-1 and the small image of the region 110-2, and thus a result of determining the number of pairs of regions determined to have a difference between small images thereof among each pair of a region 110-1 of the object LCU and a region of every same position LCU (a summation result) is 1.

In the example shown in FIG. 2, it is determined that there is a difference between the small image of the region 120-1 and the small image of the region 120-3 and it is determined that there is a difference between the small image of the region 120-1 and the small image of the region 120-4, and thus a result of determining the number of pairs of regions determined to have a difference between small images thereof among each pair of the region 120-1 of the object LCU and a region of every same position LCU is 2.

In the example shown in FIG. 2, it is determined that there is a difference between the small image of the region 130-1 and the small image of the region 130-2, it is determined that there is a difference between the small image of the region 130-1 and the small image of the region 130-3, and it is determined that there is a difference between the small image of the region 130-1 and the small image of the region 130-4, and thus a result of determining the number of pairs of regions determined to have a difference between small images thereof among each pair of the region 130-1 of the object LCU and a region of every same position LCU is 3.

The evaluation index unit 26 assigns a result of determining the number of pairs of regions to have a difference between small images thereof among each pair of a region of the object LCU and a region of every same position LCU as the evaluation index to the region of the object LCU. The evaluation index unit 26 outputs the determination result as the evaluation index to the image processing unit 27. The evaluation index unit 26 may output the determination result as the evaluation index to the display device 30. The evaluation index unit 26 serving as the evaluation index acquisition unit may acquire an evaluation index on the basis of at least one of the number of regions determined to have a difference between a region of the object LCU in the object image and a region of each same position LCUs in the reference images and the number of regions determined not to have a difference between the region of the object LCU in the object image and the region of each same position LCUs in the reference images.

The evaluation index indicates a priority for evaluating the difference if a probability that the presence or absence of a difference will be erroneously determined by the difference determination unit 25 is less than a first threshold value. A region of the object LCU for which the number of pairs of regions determined to have differences between small images thereof among each pair of the region of the object LCU and a region of every same position LCU is large is a region where the priority for evaluating the differences is high. That is, the region of the object LCU for which the number of regions determined not to have the difference between the small images thereof among each pair of the region of the object LCU and a region of every same position LCU is large is a region where a priority for evaluating the difference is low.

The evaluation index unit 26 may classify each of object LCUs as a class indicating a priority of evaluation on the basis of the number of regions determined to have a difference between the region of the object LCU in the object image and the region of each same position LCU in the reference images. The evaluation index unit 26 may obtain a priority of a class to which the object LCU determined to have differences from the same position LCUs belongs as the evaluation index.

The evaluation index indicates accuracy of a result of determining that there is a difference between small images if a probability that the presence or absence of a difference will be erroneously determined by the difference determination unit 25 is greater than or equal to the first threshold value. The region of the object LCU for which the number of pairs of regions determined to have a difference between small images thereof among each pair of the region of the object LCU and a region of every same position LCU is large is a region where the accuracy of the result of determining that there is a difference between the small images is high. That is, the region of the object LCU for which the number of pairs of regions determined not to have a difference between small images thereof among each pair of the region of the object LCU and a region of every same position LCU is large is a region where the accuracy of the result of determining that there is no difference between the small images is high.

The image processing unit 27 acquires the determination result as the evaluation index from the evaluation index unit 26. The image processing unit 27 acquires the object image from the image acquisition unit 23. The image processing unit 27 performs image processing on the object image on the basis of the determination result serving as the evaluation index from the evaluation index unit 26. The image processing unit 27 outputs the object image on which the image processing has been performed to the display device 30. The image processing unit 27 may generate an image including an operation key image as one of graphical user interfaces.

Figure 3:
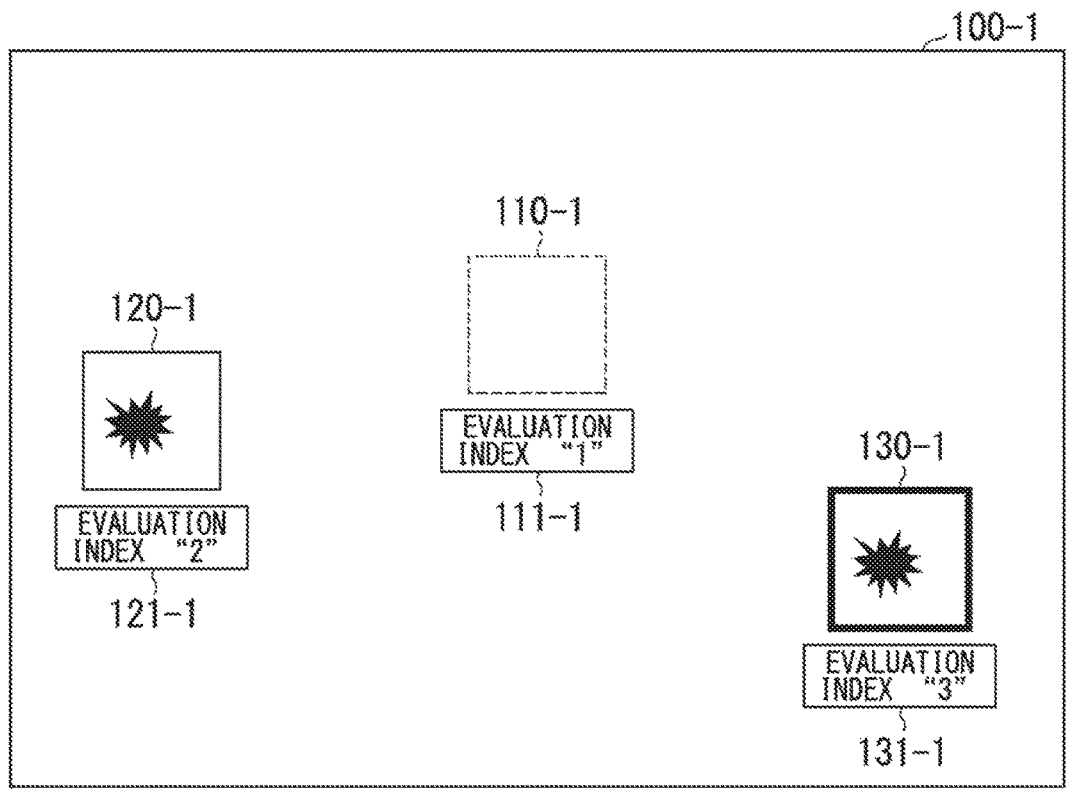
FIG. 3 is a diagram showing a first example of display of an image on which image processing has been performed according to the first embodiment.

FIG. 3 is a diagram showing a first example of display of an image 100-1 on which image processing has been performed. The image processing unit 27 outputs the image 100-1 including a frame image surrounding a region 110-1, a frame image surrounding a region 120-1, and a frame image surrounding a region 130-1 to the display device 30. The frame image surrounding the region 110-1, the frame image surrounding the region 120-1, and the frame image surrounding the region 130-1 may differ according to the determination result serving as the evaluation index. For example, the thickness of a frame of the frame image may differ according to the determination result serving as the evaluation index. The color of the frame image may differ according to the determination result serving as the evaluation index.

Hereinafter, an image of a field for displaying the evaluation index is referred to as an "index display field image". The image processing unit 27 may output the image 100-1 including an index display field image 111-1, an index display field image 121-1, and an index display field image 131-1 to the display device 30.

Figure 4:
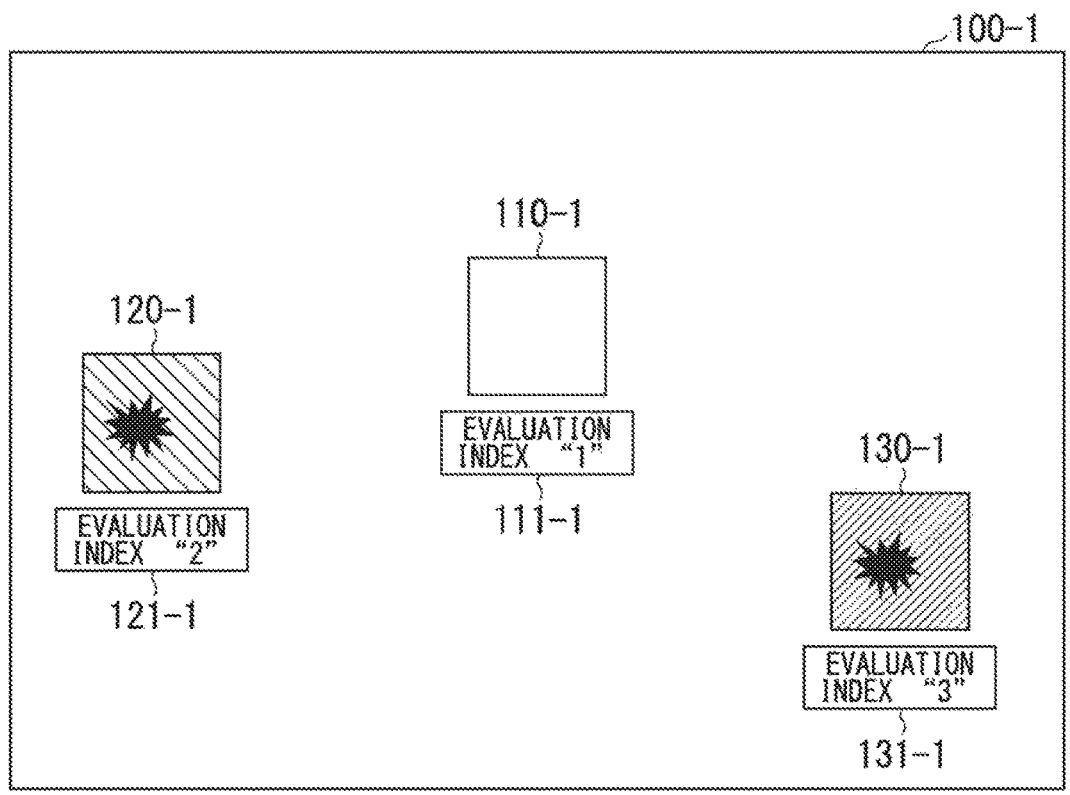
FIG. 4 is a diagram showing a second example of display of an image on which image processing has been performed according to the first embodiment.

FIG. 4 is a diagram showing a second example of display of the image 100-1 on which image processing has been performed. The image processing unit 27 may shade the region in accordance with a value indicating the determination result serving as the evaluation index among the region 110-1, the region 120-1, and the region 130-1. The image processing unit 27 may cause a region to blink in accordance with the value indicating the determination result serving as the evaluation index among the region 110-1, the region 120-1, and the region 130-1.

Figure 5:
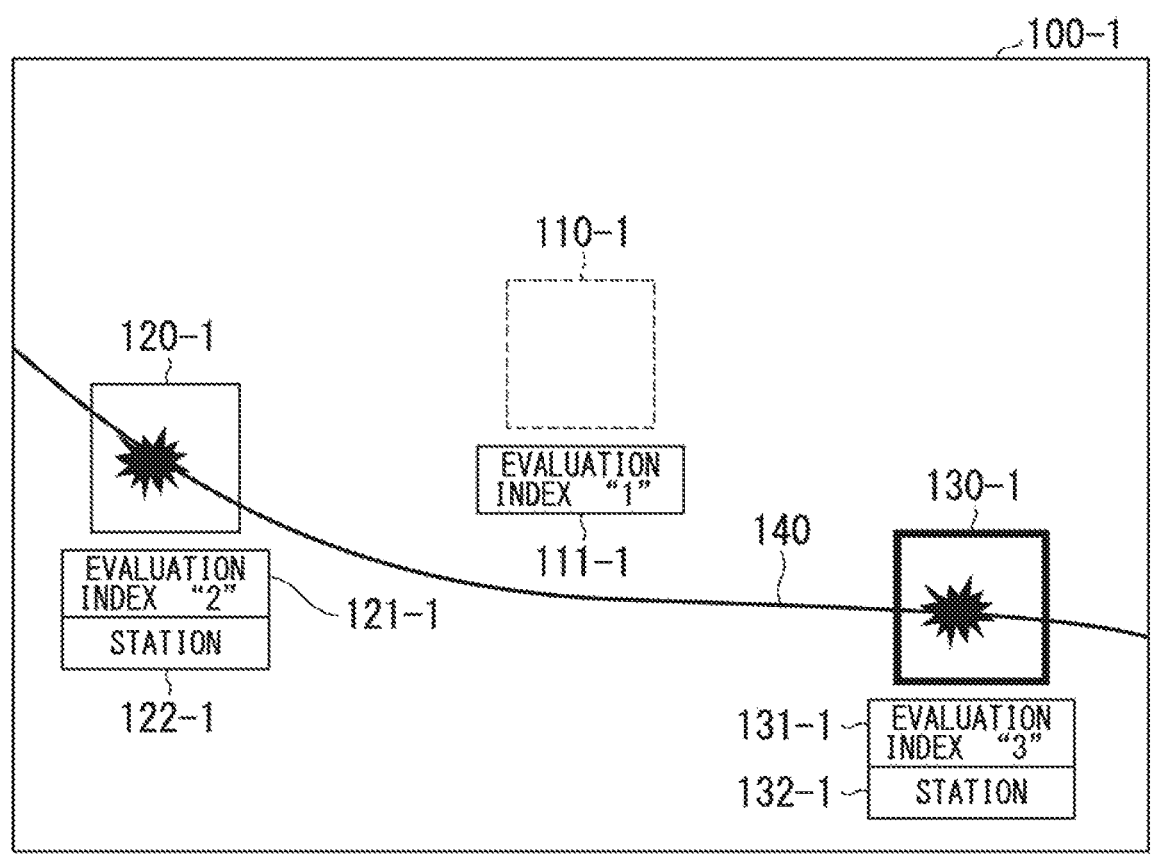
FIG. 5 is a diagram showing a third example of display of an image on which image processing has been performed according to the first embodiment.

FIG. 5 is a diagram showing a third example of display of the image 100-1 on which image processing has been performed. The image processing unit 27 may superimpose a map on the image 100-1. For example, the image processing unit 27 may superimpose a name display field image 122 and a name display field image 132, which are images for displaying names such as place names and facility names, on the image 100-1. The image processing unit 27 may superimpose a map image 140 representing a figure of the facility on the map on the image 100-1. The image processing unit 27 may superimpose a map image representing a three-dimensional figure of a building on the map on the image 100-1.

Figure 6:
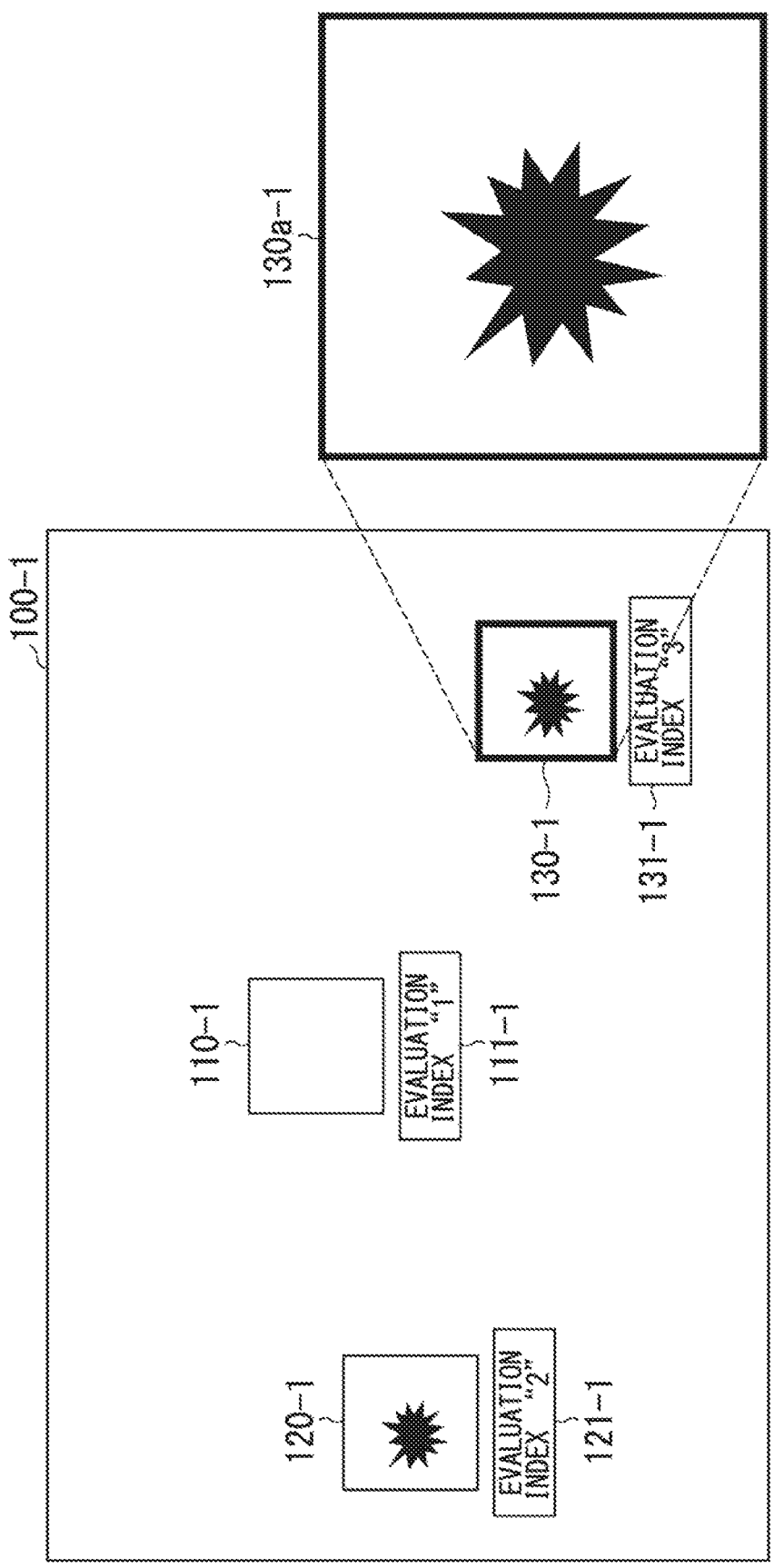
FIG. 6 is a diagram showing a fourth example of display of an image on which image processing has been performed according to the first embodiment.

FIG. 6 is a diagram showing a fourth example of display of the image 100-1 on which image processing has been performed. The image processing unit 27 may generate an image obtain by enlarging a small image of a region within the image 100-1. For example, the image processing unit 27 may generate a region-enlarged image 130*a*-1 obtained by enlarging a small image of a region 130-1. The resolution of the region-enlarged image 130*a*-1 may be higher than the resolution of the image in the region 130-1. The image processing unit 27 may output an image in which the image 100-1 and the region-enlarged image 130*a*-1 are arranged to the display device 30.

The image processing unit 27 may select a small image to be enlarged from small images of regions within the image 100-1 on the basis of the evaluation index obtained for each region. For example, the image processing unit 27 may enlarge a small image of a region having a highest evaluation index, priority, or accuracy.

Figure 7:
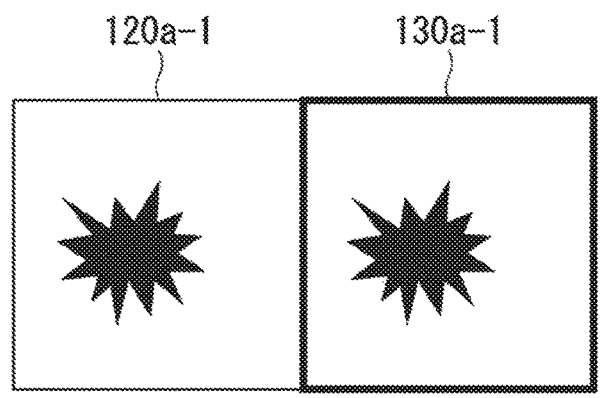
FIG. 7 is a diagram showing a fifth example of display of an image on which image processing has been performed according to the first embodiment.

FIG. 7 is a diagram showing a fifth example of display of the image 100-1 on which image processing has been performed. The image processing unit 27 may generate images obtained by enlarging small images of a plurality of regions in the image 100-1. For example, the image processing unit 27 may generate a region-enlarged image 120*a*-1 obtained by enlarging a small image of a region 120-1. For example, the image processing unit 27 may generate a region-enlarged image 130*a*-1 obtained by enlarging a small image of a region 130-1. The image processing unit 27 may output an image in which the region-enlarged image 120*a*-1 and the region-enlarged image 130*a*-1 are arranged to the display device 30. The image processing unit 27 may select a small image to be enlarged from the small images of the regions within the image 100-1 on the basis of the evaluation index obtained for each region. For example, the image processing unit 27 may enlarge small images of some regions each having a higher evaluation index, priority, or accuracy than other regions.

Figure 8:
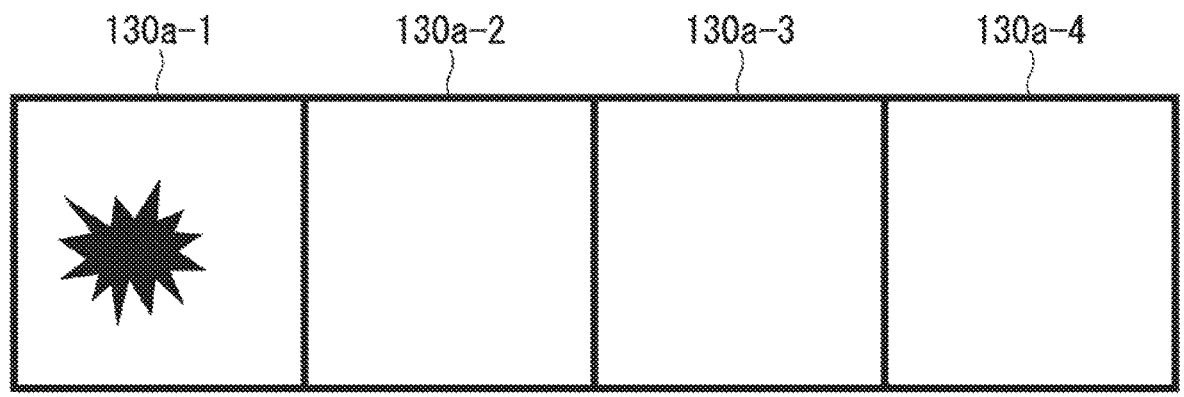
FIG. 8 is a diagram showing a sixth example of display of an image on which image processing has been performed according to the first embodiment.

FIG. 8 is a diagram showing a sixth example of display of the image 100-1 on which image processing has been performed. The image processing unit 27 may generate region-enlarged images for small images from the image 100-1 to the image 100-4. For example, the image processing unit 27 may generate region-enlarged images 130*a*-2 to 130*a*-4 similar to the region-enlarged image 130*a*-1. The image processing unit 27 may output an image in which images from the region-enlarged image 130*a*-1 to the region-enlarged image 130*a*-4 are arranged in a chronological order to the display device 30. The image processing unit 27 may select a small image to be enlarged from small images of regions within the images 100-1 to 100-4 on the basis of the evaluation index obtained for each region. For example, the image processing unit 27 may enlarge a small image of a region having a highest evaluation index, priority or accuracy and small images of regions within reference images corresponding to the region of the object image.

Returning to FIG. 1, description of the configuration of the evaluation support device 20*a* will be continued. The storage unit 28 includes a storage device having a non-volatile recording medium (a non-transitory recording medium) such as a magnetic hard disk device or a semiconductor storage device. The storage unit 28 stores a determination result from the difference determination unit 25. The storage unit 28 may store a high-resolution image of substantially the same spatial region imaged in the object image. The storage unit 28 may store map information. The storage unit 28 may store a determination result from the evaluation index unit 26 as an evaluation index.

Figure 9:
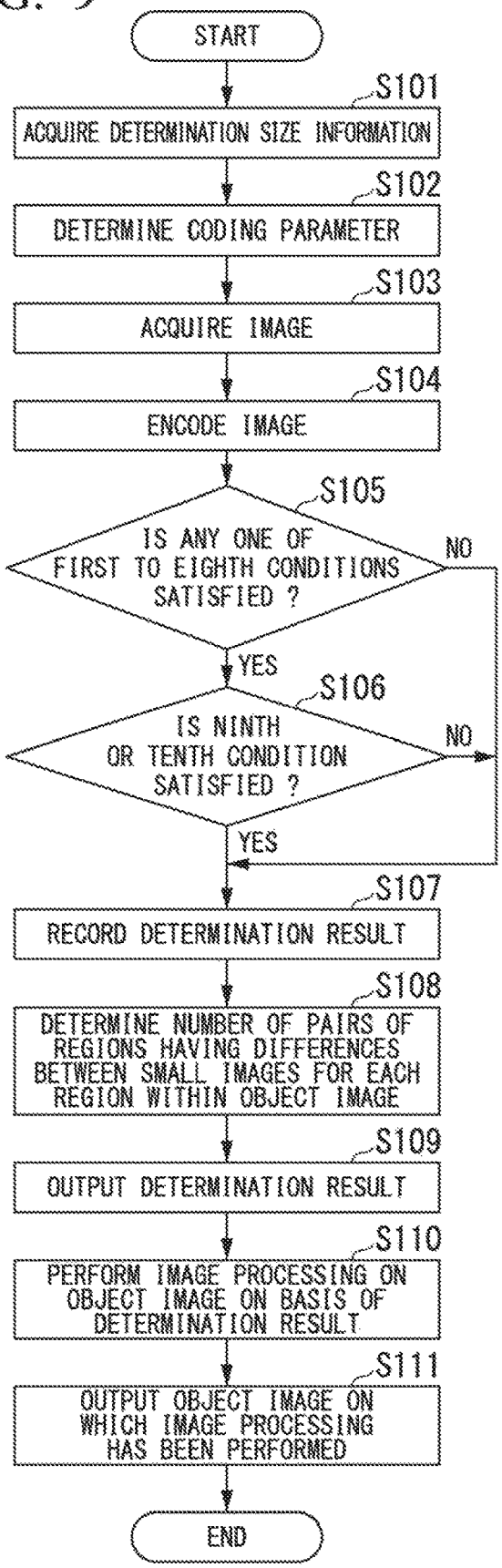
FIG. 9 is a flowchart showing an example of an operation of the evaluation support system according to the first embodiment.

FIG. 9 is a flowchart showing an example of an operation of the evaluation support system 1. The size acquisition unit 21 acquires determination size information (step S101). The parameter determination unit 22 determines an encoding parameter such as an encoding size on the basis of a determination size (step S102). The image acquisition unit 23 acquires three or more time-series images from the database 10 (step S103). The encoding unit 24 encodes the time-series images (step S104).

The difference determination unit 25 determines whether or not a relationship between the amount of coding bits of a region of an object LCU and the amount of coding bits of a region of an adjacent LCU satisfies any one of the first to eighth conditions (step S105). If the relationship between the amount of coding bits of the region of the object LCU and the amount of coding bits of the region of the adjacent LCU does not satisfy all the first to eighth conditions (step S105: NO), the difference determination unit 25 moves the process to step S107 in order to record a determination result indicating that it is determined that there is no difference between a small image of a region of the object LCU and a small image of a region of the adjacent LCU in the storage unit 28.

If the relationship between the amount of coding bits of the region of the object LCU and the amount of coding bits of the region of the adjacent LCU satisfies any one of the first to eighth conditions (step S105: YES), the difference determination unit 25 determines whether or not the relationship between the amount of coding bits of the region of the object LCU and the amount of coding bits of the region of the same position LCU satisfies the ninth condition or the tenth condition (step S106).

If the relationship between the amount of coding bits of the region of the object LCU and the amount of coding bits of the region of the same position LCU does not satisfy both the ninth condition and the tenth condition (step S106: NO), the difference determination unit 25 records a determination result indicating that it is determined that there is no difference between the small image of the region of the object LCU and the small image of the region of the same position LCU in the storage unit 28 (step S107).

If the relationship between the amount of coding bits of the region of the object LCU and the amount of coding bits of the region of the same position LCU satisfies the ninth condition or the tenth condition (step S106: YES), the difference determination unit 25 records a determination result indicating that it is determined that there is a difference between a small image of the region of the object LCU and a small image of the region of the same position LCU in the storage unit 28 (step S107). The operations of steps S105 to S107 are performed for each region (object LCU) of the object image.

The evaluation index unit 26 determines the number of pairs of regions determined to have a difference between small images thereof among each pair of a region of the object LCU and a region of every same position LCU for each region of the object LCU within the object image for the image 100-1 and two or more reference images (step S108). The evaluation index unit 26 outputs a determination result serving as an evaluation index to the image processing unit 27 (step S109).

The image processing unit 27 performs image processing on the object image on the basis of the determination result serving as the evaluation index from the evaluation index unit 26 (step S110). The image processing unit 27 outputs the object image on which image processing has been performed to the display device 30 (step S111).

As described above, the evaluation support device 20a of the first embodiment includes the evaluation index unit 26. The evaluation index unit 26, served as a determination result acquisition unit configured to acquire a determination result, acquires a determination result of the presence or absence of a difference between a small image of a region within an object image that is one of three or more time-series images in which substantially the same spatial region is imaged and a small image of region of each of reference images that are other images among the time-series images. The evaluation index unit 26 obtains a result of determining the number of pairs of regions determined to have differences between small images thereof for each region within the object image with respect to the time-series images as an evaluation index. That is, the evaluation support device 20a can obtain the evaluation index based on qualities of the time-series images that are stored on the basis of the presence or absence of differences between small images.

In the conventional technology, there is a problem that it is difficult for the user to determine one of a plurality of regions within an image for which a difference between time-series images is preferentially evaluated. By giving the evaluation index to the user, the evaluation support device 20a of the first embodiment can support the user to determine one of a plurality of regions within an image for which a difference between time-series images is preferentially evaluated.

One of the features of the evaluation support device 20a serving as an image evaluation device is to obtain an evaluation index based on a difference between images with respect to a plurality of time-series images stored in the database 10. In the evaluation support device 20a, the evaluation index unit 26 serving as the determination result acquisition unit acquires a determination result for differences between a region of the object LCU in the object image and regions of the same position LCUs in the reference images. The evaluation index unit 26 serving as the evaluation index acquisition unit acquires an evaluation index for each region within the object image on the basis of at least one of the number of determinations of the presence of a difference between a region of the object LCU in the object image and a region of the same position LCU in each reference image and the number of determinations of the absence of a difference between a region of the object LCU in the object image and a region of the same position LCU in each reference image. Through the processing based on the difference between the images, the evaluation support device 20a can obtain a consistent evaluation index even if the number of stored images increases. Furthermore, the evaluation support device 20a can indicate a region for which a difference is preferentially evaluated in a time-series image on the basis of an obtained evaluation index and give a meaning to each region in the time-series image.

If the probability that the presence or absence of differences between small images will be erroneously determined is less than the first threshold value, the evaluation index unit 26 of the first embodiment obtains a value indicating a priority for evaluating the difference. If the probability that the presence or absence of differences between small images will be erroneously determined is greater than or equal to the first threshold value, the evaluation index unit 26 of the first embodiment obtains a value indicating the accuracy of a result of determining that there are differences between small images.

Second Embodiment

A second embodiment is different from the first embodiment in that a determination result serving as an evaluation index represented in a multivalued form is rounded to a binary value. In the second embodiment, only differences from the first embodiment will be described.

Figure 10:
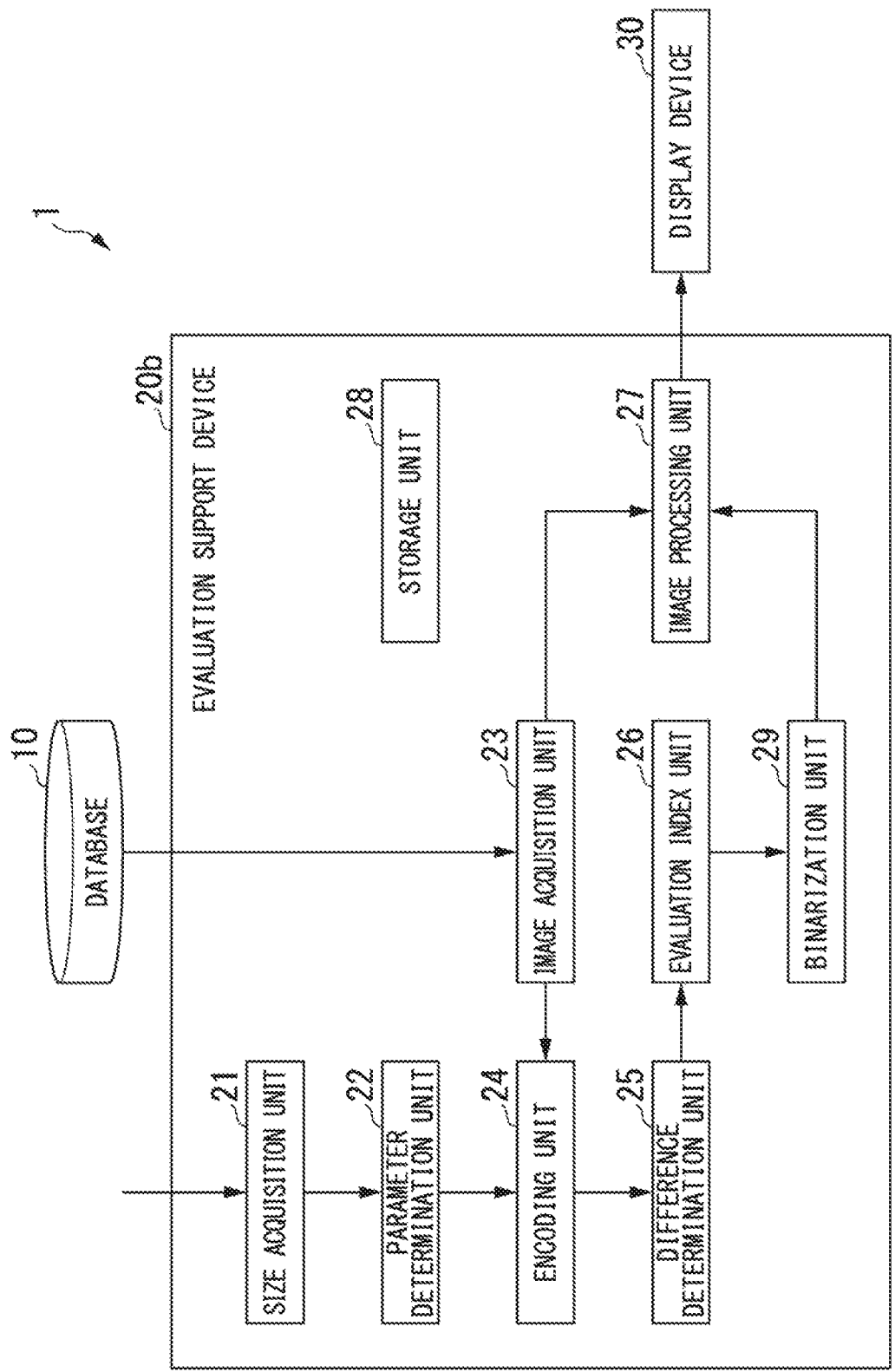
FIG. 10 is a diagram showing an example of a configuration of an evaluation support system according to a second embodiment.

FIG. 10 is a diagram showing an example of a configuration of an evaluation support system 1. The evaluation support system 1 includes a database 10, an evaluation support device 20b, and a display device 30. An evaluation index output from the evaluation support device 20b indicates a binary value (the presence or absence of differences between small images) that is a comparison result between a value corresponding to the evaluation index represented in a multivalued form given by the evaluation index unit 26 and a second threshold value.

The evaluation support device 20b serving as an image evaluation device includes a size acquisition unit 21, a parameter determination unit 22, an image acquisition unit 23, a encoding unit 24, a difference determination unit 25, an evaluation index unit 26, an image processing unit 27, a storage unit 28, and a binarization unit 29.

As an example, the image acquisition unit 23 acquires time-series images shown in FIG. 2 from the database 10. In the second embodiment, a probability that the difference determination unit 25 will erroneously determine the presence or absence of a difference is greater than or equal to a predetermined fixed probability. The evaluation index unit 26 outputs the determination result serving as the evaluation index to the binarization unit 29.

The binarization unit 29 obtains an evaluation index (a binary value) represented by the presence or absence of a difference between the small images on the basis of the determination result serving as the evaluation index from the evaluation index unit 26. For example, the binarization unit 29 divides the number of pairs (the number of pairs having changes) of regions determined to have differences between small images thereof among each pair of a region of the object LCU and a region of every same position LCU by the total number of pairs of the region of the object LCU and the region of each same position LCU for each region of the object LCU. That is, the binarization unit 29 divides a result of determining the number of pairs having changes (a summation result) by the total number of pairs of a region of the object LCU and a region of each same position LCU for each region of the object LCU. The binarization unit 29 assigns the evaluation index represented by the presence or absence of differences between small images to the region of the object LCU.

In the example shown in FIG. 2, the number of pairs of regions determined to have differences between small images thereof among each pair of the region 110-1 of the object LCU and the region of every same position LCU is 1. The total number of pairs of the region 110-1 of the object LCU and the region of each same position LCUs is 3. The binarization unit 29 obtains a division result (1/3), which is a value corresponding to the evaluation index assigned by the evaluation index unit 26, for the region 110-1 of the object LCU.

In the example shown in FIG. 2, the number of pairs of regions determined to have differences between small images thereof among each pair of the region 120-1 of the object LCU and the region of every same position LCU is 2. The total number of pairs of the region 120-1 of the object LCU and the region of each same position LCU is 3. The binarization unit 29 obtains a division result (2/3), which is a value corresponding to the evaluation index assigned by the evaluation index unit 26, for the region 120-1 of the object LCU.

In the example shown in FIG. 2, the number of pairs of regions determined to have differences in small images thereof among each pair of the region 130-1 of the object LCU and the region of every same position LCU is 3. The total number of pairs of the region 130-1 of the object LCU and the region of each same position LCU is 3. The binarization unit 29 obtains a division result (3/3), which is a value corresponding to the evaluation index assigned by the evaluation index unit 26, for the region 130-1 of the object LCU. The binarization unit 29 may record the division result in the storage unit 28.

The binarization unit 29 compares a magnitude relationship between a threshold value predetermined between 0 and 1 and a division result for each region of the object LCU. The binarization unit 29 defines a pair of a region of the object LCU and a region of the same position LCU for which the division result is greater than or equal to the threshold value as a pair of regions determined to have a difference between small images thereof among each pair of a region of the object LCU and a region of the same position LCU. The binarization unit 29 defines a pair of a region of an object LCU and a region of the same position LCU for which the division result is less than the threshold value as a pair of regions determined not to have a difference between a region of the object LCU and a region of the same position LCU. Hereinafter, the threshold value is (0.5) among values greater than or equal to 0 and less than 1.

In the example shown in FIG. 2, the binarization unit 29 defines pairs of the region 110-1 of the object LCU and a region of each of the same position LCUs for which a division result (1/3) is less than the threshold value 0.5 as pairs of regions determined not to have a difference between small images thereof. The binarization unit 29 assigns to the region 110-1 of the object LCU an evaluation index indicating that there is no difference between small images.

The binarization unit 29 defines pairs of the region 120-1 of the object LCU and a region of each of the same position LCUs for which a division result (2/3) is greater than or equal to the threshold value 0.5 as pairs of regions determined to have a difference between small images thereof. The binarization unit 29 assigns to the region 120-1 of the object LCU an evaluation index indicating that there is a difference between small images.

The binarization unit 29 defines pairs of the region 130-1 of the object LCU and a region of each of the same position LCUs for which a division result (3/3) is greater than or equal to the threshold value 0.5 as pairs of regions determined to have a difference between small images thereof. The binarization unit 29 assigns to the region 130-1 of the object LCU an evaluation index indicating that there is a difference between the small images.

The binarization unit 29 outputs an evaluation index indicating the presence or absence (a binary value) of differences between small images to the image processing unit 27 for each region of the object LCU.

The image processing unit 27 acquires an evaluation index indicating the presence or absence of differences between small images from the binarization unit 29. The image processing unit 27 performs image processing on the object image on the basis of the evaluation index indicating the presence or absence of differences between small images.

The evaluation index according to the second embodiment is represented by the presence or absence of differences between small images. If the probability that the difference determination unit 25 will erroneously determine the presence or absence of a difference is greater than or equal to a fixed probability, a region of an object LCU determined to have a difference in small image thereof from those of the same position LCUs by the binarization unit 29 is a region for which a priority for evaluating the difference is high.

As described above, the evaluation support device 20b of the second embodiment includes the binarization unit 29. The binarization unit 29 obtains an evaluation index indicating the presence or absence of differences between small images on the basis of a comparison result between a value corresponding to the evaluation index from the evaluation index unit 26 and the second threshold value.

Thereby, even when the probability that the presence or absence of a difference will be erroneously determined is greater than or equal to the fixed probability, the evaluation support device 20a of the second embodiment can more reliably support the user to determine a region for which a difference between time-series images is preferentially evaluated among a plurality of regions within an image.

The binarization unit 29 may compare a magnitude relationship between a threshold value and the number of pairs of regions determined to have differences between small images thereof between a region of the object LCU and a region of each same position LCU (the number of pairs having changes) for each region of the object LCU. The binarization unit 29 may determine each pair of a region of the object LCU and a region of the same position LCU for which the number of pairs having changes is greater than or equal to the threshold value as a pair of regions determined to have a difference in small images thereof between a region of the object LCU and a region of the same position LCU. Even in this case, the evaluation support device 20a of the second embodiment can obtain an effect similar to that of a case in which the division result is used.

The binarization unit 29 may obtain a binary index indicating the presence or absence of differences between small images on the basis of a priority or accuracy obtained by the evaluation index unit 26. For example, the binarization unit 29 may assign to a region of the object LCU an index indicating that there is differences between small images if the accuracy is greater than or equal to a predetermined value. The binarization unit 29 may assign to the region of the object LCU an index indicating that there is no difference between the small images if the accuracy is less than the predetermined value.

Third Embodiment

Figure 11:
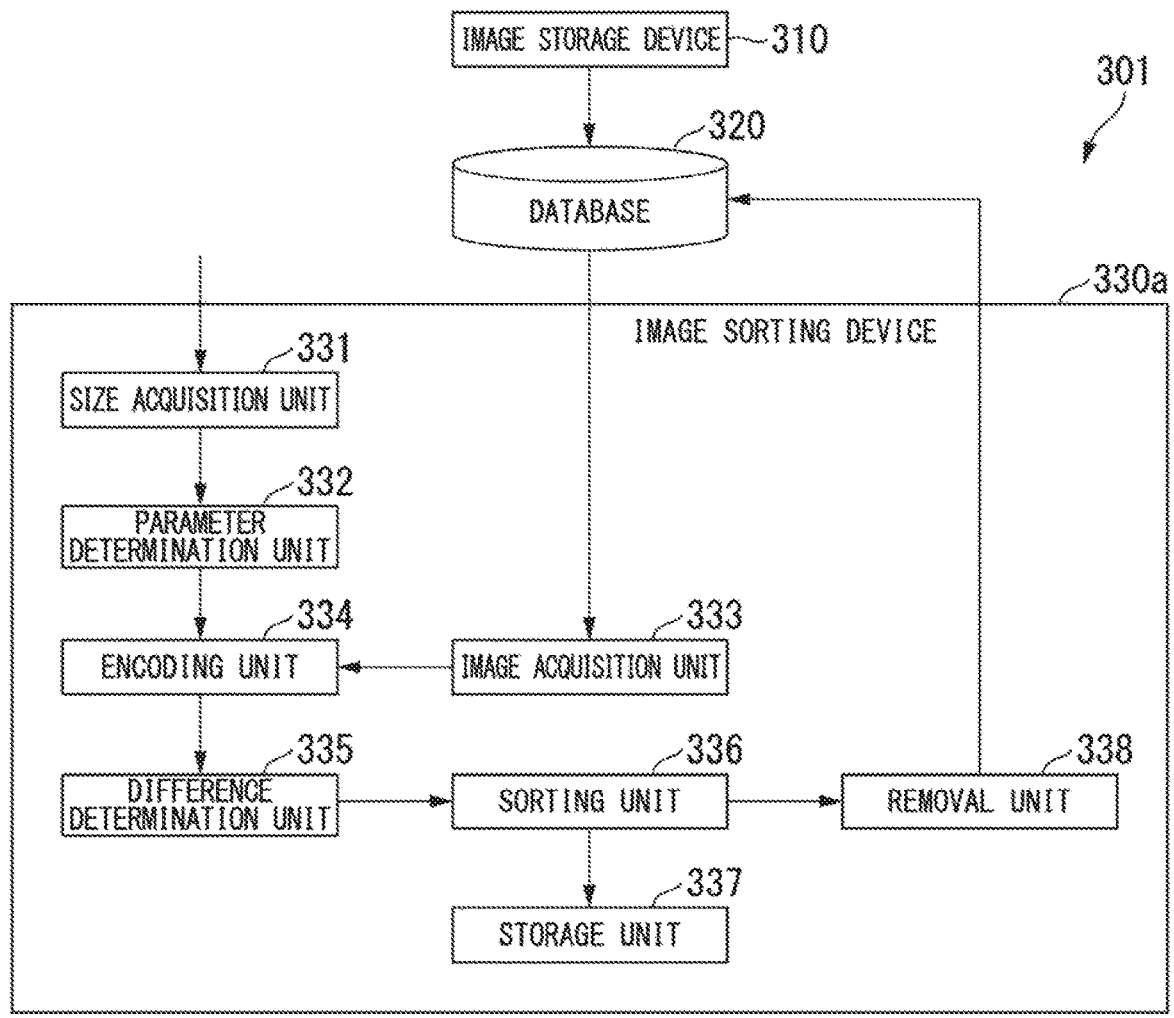
FIG. 11 is a diagram showing an example of a configuration of an image sorting system according to a third embodiment.

FIG. 11 is a diagram showing an example of a configuration of an image sorting system 301. The image sorting system 301 is a system for sorting images. The image sorting system 301 includes an image storage device 310, a database 320, and an image sorting device 330a serving as an image evaluation device.

The image storage device 310 is an information processing device configured to store images. The image storage device 310 performs a filtering process of sorting images that satisfy a quality standard desired by a user with predetermined accuracy on time-series images. For example, the quality standard means that a spatial region having an area having a fixed proportion or more among spatial regions of an imaging object is imaged. For example, when the image is an aerial image or a satellite image, the quality standard means that a region of an area on a ground surface having a fixed proportion or more is imaged without being hidden by clouds or fog. Substantially the same spatial region is imaged in the time-series images. The images are, for example, medical images, monitoring images, aerial images, or satellite images. The satellite images are obtained by imaging, for example, substantially the same spatial region on a ground surface from an artificial satellite at a frequency of about once per day.

As another example, also in the third embodiment and the fourth to sixth embodiments to be described below, the quality standard may mean the ease of detection of a change in the imaging object between stored images. Furthermore, if the imaging object appears clearly in the image, it may be determined that the image satisfies the quality standard. That is, the quality standard may be defined with respect to the imaging object.

Figure 12:
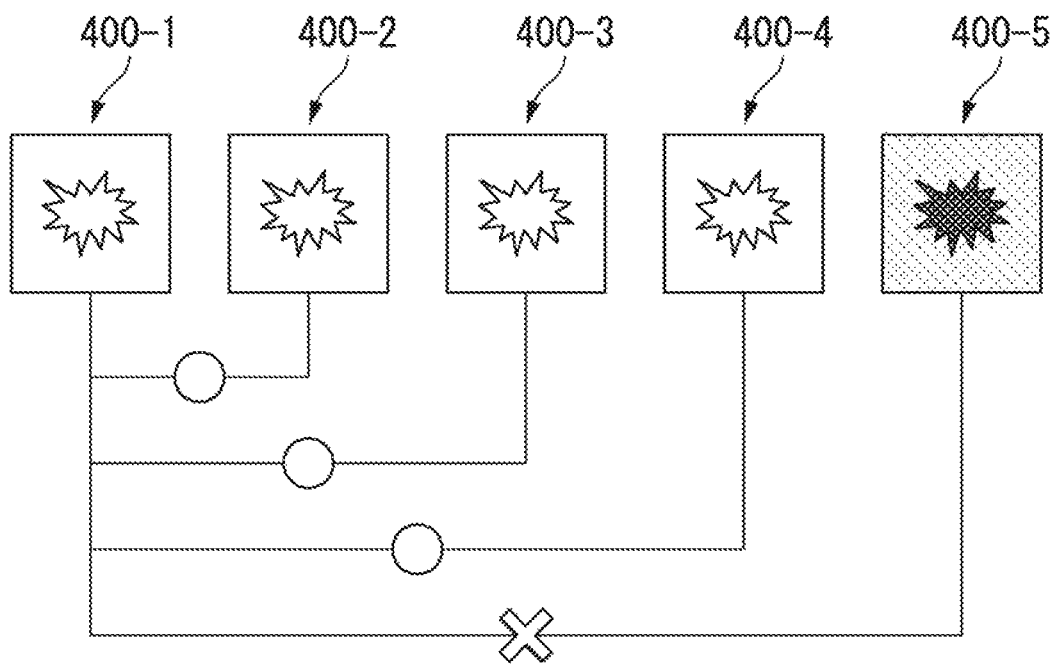
FIG. 12 is a diagram showing a first example of a determination of the presence or absence of a difference between images according to the third embodiment.
Figure 13:
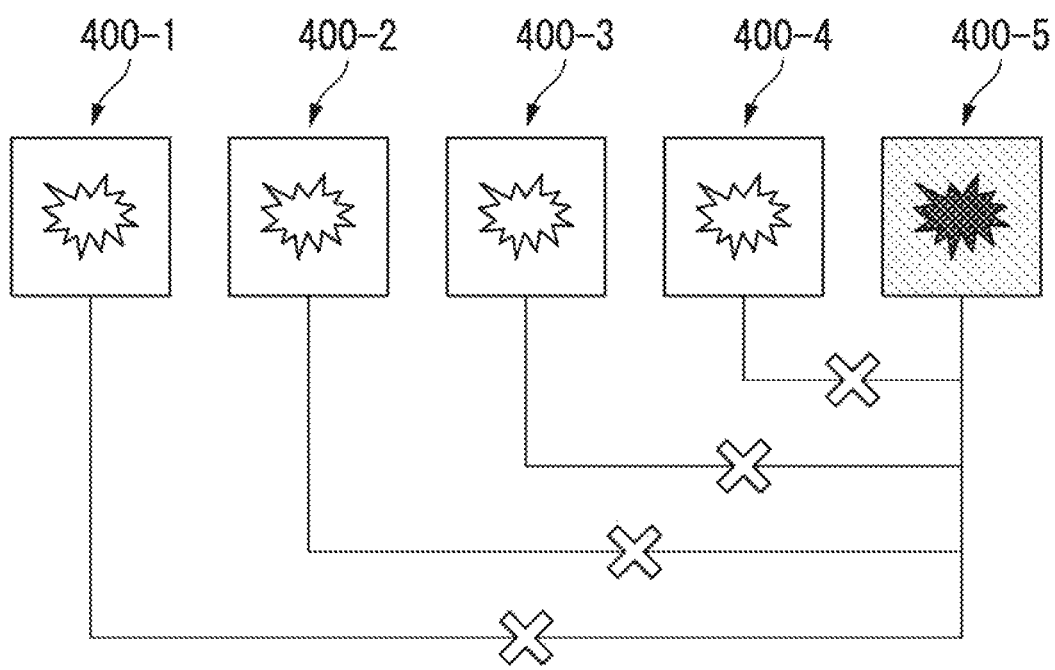
FIG. 13 is a diagram showing a second example of a determination of the presence or absence of a difference between images according to the third embodiment.

The image storage device 310 executes, for example, a process of a data evaluation unit shown in FIG. 9, FIG. 12, and FIG. 13 of Patent Document 1 as a filtering process. The image storage device 310 stores time-series images classified through the filtering process in the database 320. In the third embodiment, the image storage device 310 does not add a new image to the time-series images stored in the database 320 after the images classified through the filtering process with predetermined accuracy are stored in the database 320.

The database 320 includes a storage device having a non-volatile recording medium (a non-transitory recording medium) such as a magnetic hard disk device or a semiconductor storage device. The database 320 stores time-series images classified through a filtering process with predetermined accuracy. The majority of the time-series images stored in the database 320 satisfy the quality standard desired by the user. For example, the majority of time-series images stored in the database 320 satisfy the quality standard desired by a user (clear images). However, some of the time-series images stored in the database 320 do not satisfy the quality standard desired by the user in accordance with the accuracy of the filtering process.

The image includes a plurality of regions (blocks). The shape of the region within the image is, for example, a rectangle. The region within the image is defined in an image in a unit of, for example, a macro block (MB) of Moving Picture Experts Group (MPEG) or the like, a coding unit (CU) of high efficiency video coding (HEVC) or the like, a largest CU (LCU), a prediction unit (PU), or a transform unit (TU). Hereinafter, a case in which the region is defined in an image in a unit for a largest coding unit will be described.

The image sorting device 330a is an information processing device configured to sort time-series images stored in the database 320. The image sorting device 330a acquires the time-series images from the database 320. The image sorting device 330a determines the presence or absence of a difference between the time-series images. The image sorting device 330a sorts an image that satisfies the quality standard desired by the user and an image that does not satisfy the quality standard desired by the user from the time-series images stored in the database 320. The image sorting device 330a removes images that do not satisfy the quality standard desired by the user from the time-series images stored in the database 320.

The image sorting device 330a includes a size acquisition unit 331, a parameter determination unit 332, an image acquisition unit 333, an encoding unit 334, a difference determination unit 335, a sorting unit 336, a storage unit 337, and a removal unit 338.

For example, some or all of the size acquisition unit 331, the parameter determination unit 332, the image acquisition unit 333, the encoding unit 334, the difference determination unit 335, the sorting unit 336, and the removal unit 338 may be implemented by a processor such as a central processing unit (CPU) executing a program stored in the storage unit 337 or implemented by using hardware such as large scale integration circuit (LSI) or an application specific integrated circuit (ASIC).

The size acquisition unit 331 externally acquires information indicating a size of an object (a determination object on the image) in which a difference is desired to be determined on the image. Hereinafter, a size of a determination object and information indicating the size are referred to as "determination size" and "determination size information", respectively. Hereinafter, the determination size is a size of the largest coding unit. For example, the determination size is represented using the number of pixels. The size acquisition unit 331 transmits the determination size information to the parameter determination unit 332.

The parameter determination unit 332 at least determines encoding parameters including information indicating the size of the largest coding unit (hereinafter referred to as an "encoding size") on the basis of the determination size. The parameter determination unit 332 transmits encoding parameters including information indicating the encoding size and the like to the encoding unit 334.

The image acquisition unit 333 acquires time-series images from the database 320. For example, the image acquisition unit 333 acquires time-series images including three or more images. The image acquisition unit 333 transmits the time-series images to the encoding unit 334.

Hereinafter, an image of an object for which it is determined whether or not there is a difference from the reference image is referred to as an "object image". The reference image is an image of the time-series other than the object image. The time-series images are sorted into the object image and reference images by the image acquisition unit 333 or the difference determination unit 335 on the basis of a predetermined condition. The time-series images may be divided into the object image and the reference images and stored in the database 320.

The encoding unit 334 encodes the time-series images. For example, the encoding unit 334 may execute H.264/advanced video coding (AVC), HEVC, a moving-image coding process of MPEG or the like on the basis of encoding parameters. The encoding unit 334 may execute a still-image coding process of JPEG or the like on the basis of encoding parameters.

The encoding unit 334 encodes the object image and the reference images on the basis of a determination size. If the HEVC video coding process is executed, the encoding unit 334 performs an HEVC intra-coding process based on the determination size on the object image and the reference images.

Hereinafter, a largest coding unit within the object image is referred to as an "object LCU". Hereinafter, the largest coding unit adjacent to the object LCU in the object image is referred to as an "adjacent LCU". Hereinafter, a largest coding unit spatially having substantially the same position as the object LCU in the reference image is referred to as a "same position LCU". Hereinafter, an image within a region is referred to as a "small image of a region".

The difference determination unit 335 determines the presence or absence of a difference between a small image of a region of the object LCU and a small image of a region of an adjacent LCU on the basis of a difference between a pixel value of the small image of the region of the object LCU and a pixel value of the small image of the region of the adjacent LCU. For example, the difference determination unit 335 determines the presence or absence of a difference between a small image of a region of the object LCU and a small image of a region of the adjacent LCU on the basis of a difference between the amount of coding bits of the region of the object LCU and the amount of coding bits of the region of the adjacent LCU.

If there is a difference between the small image of the region of the object LCU and the small image of the region of the adjacent LCU, the difference determination unit 335 further determines the presence or absence of a difference between the small image of the region of the object LCU and the small image of the region of the same position LCU. The difference determination unit 335 determines the presence or absence of a difference between the small image of the region of the object LCU and the small image of the region of the same position LCU on the basis of a difference between a pixel value of the small image of the region of the object LCU and a pixel value of the small image of the region of the same position LCU. For example, the difference determination unit 335 determines the presence or absence of a difference between the small image of the region of the object LCU and the small image of the region of the adjacent position LCU on the basis of a difference between the amount of coding bits of the small image of the region of the object LCU and the amount of coding bits of the small image of the region of the same position LCU.

A method in which the difference determination unit 335 determines the presence or absence of the difference between the object image and the reference image is not limited to a specific method. Hereinafter, a method in which the difference determination unit 335 determines the presence or absence of differences between small images on the basis of the amount of coding bits in the coding process will be described as an example.

The difference determination unit 335 compares the amount of coding bits of the region of the object LCU with the amount of coding bits of regions of adjacent LCUs on the top, bottom, left and right of the region of the object LCU. For example, the difference determination unit 335 determines whether or not the relationship between the amount of coding bits of the region of the object LCU and the amount of coding bits of the region of the adjacent LCU satisfies any one of the following eleventh to eighteenth conditions.

Eleventh condition: max $(R(N-1)/R(N), R(N)/R(N-1)) > R\_Th1$

Twelfth condition: max $(R(N+1)/R(N), R(N)/R(N+1)) > R\_Th1$

Thirteenth condition: max $(R(N-x)/R(N), R(N)/R(N-x)) > R\_Th1$

Fourteenth condition: max $(R(N+x)/R(N), R(N)/R(N+x)) > R\_Th1$

Fifteenth condition: min $(R(N-1)/R(N), R(N)/R(N-1)) < R\_Th2$

Sixteenth condition: min $(R(N+1)/R(N), R(N)/R(N+1)) < R\_Th2$

Seventeenth condition: min $(R(N-x)/R(N), R(N)/R(N-x)) < R\_Th2$

Eighteenth condition: min $(R(N+x)/R(N), R(N)/R(N+x)) < R\_Th2$

Here, the term "R" denotes the amount of coding bits of the region of the largest coding unit. The term "max $(R(N-1), R(N))$" denotes a larger value between the amount of coding bits $R(N-1)$ and $R(N)$. The term "min $(R(N-1), R(N))$" represents a smaller value between the amount of coding bits $R(N-1)$ and $R(N)$. The term "R_Th1" is a threshold value of the amount of coding bits that satisfies $R\_Th1>1$. The term "R_Th2" is a threshold value of the amount of coding bits that satisfies $0<R\_Th2\leq1$. The term "N" denotes an $N^{th}$ object LCU within the object image. The term "N−1" denotes the adjacent LCU on the left of the object LCU. The term "N+1" denotes the adjacent LCU on the right of the object LCU. The term "N−x" denotes the adjacent LCU on the top of the object LCU. The term "N+x" denotes the adjacent LCU on the bottom of the object LCU. The threshold value R_Th1 of the amount of coding bits in the eleventh to fourteenth conditions may be the same value as the threshold value R_Th1 of the amount of coding bits in the first to fourth conditions or may be a value different therefrom. The threshold value R_Th2 of the amount of coding bits in the fifteenth to eighteenth conditions may be the same value as the threshold value R_Th2 of the amount of coding bits in the fifth to eighth conditions or may be a value different therefrom.

If the relationship between the amount of coding bits of the region of the object LCU and the amount of coding bits of the region of the adjacent LCU does not satisfy all of the eleventh to eighteenth conditions, the difference determination unit 335 determines that there is no difference between the small image of the region of the object LCU and the small image of the region of the adjacent LCU. That is, if the difference between the amount of coding bits of the region of the object LCU and the amount of coding bits of the region of the adjacent LCU is small, the difference determination unit 335 determines that there is no difference between the small image of the region of the object LCU and the small image of the region of the adjacent LCU. The difference determination unit 335 records a result of determining that there is no difference between the small image of the region of the object LCU and the small image of the region of the adjacent LCU in the storage unit 337 in association with the region of the object LCU.

If the relationship between the amount of coding bits of the region of the object LCU and the amount of coding bits of the region of the adjacent LCU satisfies any one of the eleventh to eighteenth conditions, the difference determination unit 335 compares the amount of coding bits of the region of the object LCU with the amount of coding bits of the region of the same position LCU. For example, the difference determination unit 335 determines whether or not the relationship between the amount of coding bits of the region of the object LCU and the amount of coding bits of the region of the same position LCU satisfies the following nineteenth or twentieth condition.

Nineteenth condition: max (R_A(N)/R_B(N), R_B(N)/R_A(N))>R_Th3

Twentieth condition: min (R_A(N)/R_B(N), R_B(N)/R_A(N))<R_Th4

Here, the term "R_A" denotes the amount of coding bits of a region of the same position LCU within a reference image "A". The term "R_B" denotes the amount of coding bits of a region of an object LCU within an object image "B". The term "R_Th3" is a threshold value of the amount of coding bits that satisfies R_Th3>1. The term "R_Th4" is a threshold value of the amount of coding bits that satisfies 0<R_Th4≤1. The threshold value R_Th3 of the amount of coding bits in the nineteenth condition may be the same value as the threshold value R_Th3 of the amount of coding bits in the ninth condition or may be a value different therefrom. The threshold value R_Th4 of the amount of coding bits in the twentieth condition may be the same value as the threshold value R_Th4 of the amount of coding bits in the tenth condition or may be a value different therefrom.

When the relationship between the amount of coding bits of the region of the object LCU and the amount of coding bits of the region of the same position LCU does not satisfy both the nineteenth condition and the twentieth condition, the difference determination unit 335 determines that there is no difference between the small image of the region of the object LCU and the small image of the region of the same position LCU. That is, if the difference between the amount of coding bits of the region of the object LCU and the amount of coding bits of the region of the same position LCU is small, the difference determination unit 335 determines that there is no difference between the small image of the region of the object LCU and the small image of the region of the same position LCU. The difference determination unit 335 records a result of determining that there is no difference between the small image of the region of the object LCU and the small image of the region of the same position LCU in the storage unit 337 in association with the region of the object LCU.

If the relationship between the amount of coding bits of the region of the object LCU and the amount of coding bits of the region of the same position LCU satisfies the nineteenth or twentieth condition, the difference determination unit 335 determines that there is a difference between the small image of the region of the object LCU and the small image of the region of the same position LCU. That is, if a difference between the amount of coding bits of the region of the object LCU and the amount of coding bits of the region of the same position LCU is large, the difference determination unit 335 determines that there is a difference between the small image of the region of the object LCU and the small image of the region of the same position LCU. The difference determination unit 335 records a determination result indicating that it is determined that there is a difference between the small image of the region of the object LCU and the small image of the region of the same position LCU in the storage unit 337 in association with the region of the object LCU.

If the encoding unit 334 executes a moving-image coding process of HEVC, the difference determination unit 335 may calculate a result of determining the presence or absence of differences between small images when encoding has been performed by shifting an encoding start point defined at an upper left end of an image. The difference determination unit 335 may determine a result of combining a determination result when encoding has been performed without shifting an encoding start point and a determination result when coding has been performed by shifting the encoding start point (a logical OR result) as a final determination result.

FIG. 12 is a diagram showing an example of a determination of the presence or absence of a difference between images in the third embodiment. In FIG. 12, an image 400 encoded by the encoding unit 334 is schematically represented using the image 400 before coding. Images 400-1 to 400-5 are time-series images. For example, the image 400-1 may be an image with a latest imaging clock time. In the third embodiment, a case in which the number of reference images is four will be described as an example. If the number of reference images is two or more, the image sorting device 330a can sort images in accordance with a quality standard desired by the user.

The difference determination unit 335 selects images serving as object images one by one from the images 400-1 to 400-5. If the number of time-series images is N (N is an integer greater than or equal to 3), the difference determination unit 335 determines a difference from the time-series images (N×(N−1)/2) times.

In the example shown in FIG. 12, the image 400-1 is an object image. The images 400-2 to 400-5 are reference images. The difference determination unit 335 determines that there is no difference between the image 400-1 selected as the object image and the images 400-2 to 400-4 which are the reference images. A circle mark in FIG. 12 indicates that it is determined that there is no difference between images. The difference determination unit 335 determines that there is a difference between the image 400-1 selected as the object image and the image 400-5 as the reference image. A cross mark in FIG. 12 indicates that it is determined that there is a difference between images. Even when one of the images 400-2 to 400-4 is selected as the object image, the difference determination unit 335 similarly determines the presence or absence of a difference between the object image and the reference image.

FIG. 13 is a diagram showing a second example of the determination of the presence or absence of a difference between images in the third embodiment. In the example shown in FIG. 13, images 400-1 to 400-4 are reference images. An image 400-5 is an object image. The difference determination unit 335 determines that there is a difference between the image 400-5 selected as the object image and the images 400-1 to 400-4 that are the reference images.

Returning to FIG. 11, a description of the configuration of the image sorting device 330a will be continued. The sorting unit 336 sorts time-series images into an image that satisfies the quality standard and an image that does not satisfy a quality standard on the basis of a result of comparing the number of reference images determined to have differences from the object image with the number of reference images determined not to have a difference from the object image (a result of majority decision). For example, the sorting unit 336 calculates a result of comparing a ratio of the number of reference images determined to have differences from an object image to the total number of reference images among time-series images as an evaluation index. The sorting unit 336 determines whether or not the calculated ratio is greater than or equal to the third threshold value on the basis of a magnitude relationship shown in Equation (1). The third threshold value is a predetermined positive value less than 1.

(Number of reference images determined to have differences from object image)/(total number of reference images)≥third threshold value    (1)

In the example shown in FIG. 12, when one of the images 400-1 to 400-4 is selected as object images, a value of the left side of Equation (1) is (1/4). In the example shown in FIG. 13, when the image 400-5 is selected as the object image, a value of the left side of Equation (1) is (4/4).

The sorting unit 336 determines an object image having a value of the left side of Equation (1) greater than or equal to the third threshold value as an image that does not satisfy the quality standard desired by the user (an unclear image). The sorting unit 336 records information indicating a sorting result in the storage unit 337. The sorting unit 336 outputs information indicating the sorting result to the removal unit 338. The sorting result includes, for example, identification information of an image that does not satisfy the quality standard desired by the user.

The storage unit 337 includes a storage device having a non-volatile recording medium (a non-transitory recording medium) such as a magnetic hard disk device or a semiconductor storage device. The storage unit 337 stores a determination result from the difference determination unit 335. The storage unit 337 stores a sorting result from the sorting unit 336.

The removal unit 338 removes an image that does not satisfy the quality criteria desired by the user from the time-series images recorded in the database 320 on the basis of the sorting result. The removal unit 338 may execute an image removing process of the data evaluation unit shown in FIGS. 9, 12 and 13 of Patent Document 1.

Figure 14:
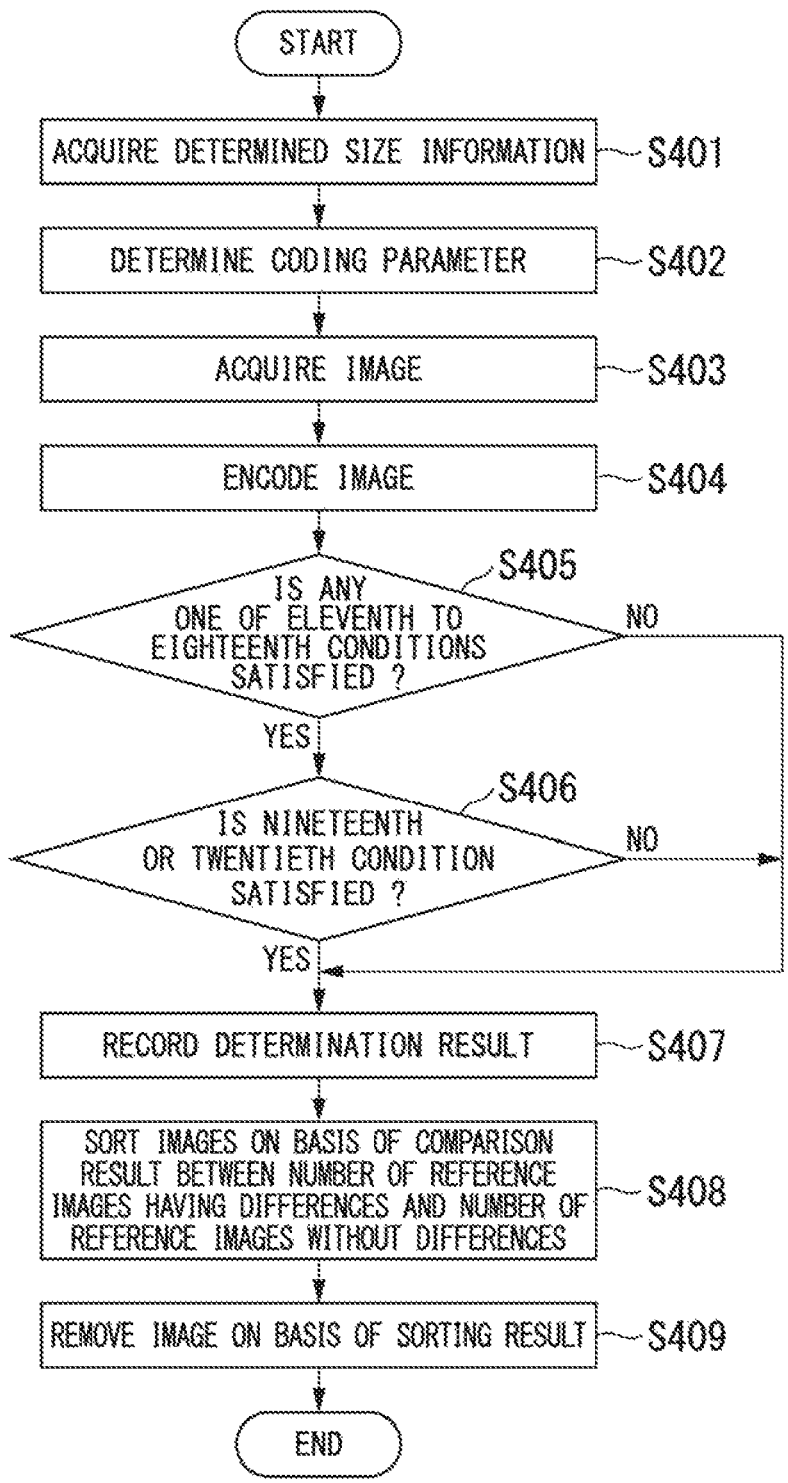
FIG. 14 is a flowchart showing an example of an operation of the image sorting system according to the third embodiment.

FIG. 14 is a flowchart showing an example of an operation of the image sorting system 301. The size acquisition unit 331 acquires determination size information (step S401). The parameter determination unit 332 at least determines an encoding parameter such as an encoding size on the basis of a determination size (step S402). The image acquisition unit 333 acquires time-series images from the database 320 (step S403). The encoding unit 334 encodes the time-series images (step S404).

The difference determination unit 335 determines whether or not a relationship between the amount of coding bits of a region of an object LCU and the amount of coding bits of a region of an adjacent LCU satisfies any one of the eleventh to eighteenth conditions (step S405). If the relationship between the amount of coding bits of the region of the object LCU and the amount of coding bits of the region of the adjacent LCU does not satisfy all of the eleventh to eighteenth conditions (step S405: NO), the difference determination unit 335 moves the process to step S407 in order to record a determination result indicating that it is determined that there is no difference between a small image of a region of the object LCU and a small image of a region of the adjacent LCU in the storage unit 337.

If the relationship between the amount of coding bits in the region of the object LCU and the amount of coding bits in the region of the adjacent LCU satisfies any one of the eleventh to eighteenth conditions (step S405: YES), the difference determination unit 335 determines whether or not the relationship between the amount of coding bits of the region of the object LCU and the amount of coding bits of the region of the same position LCU satisfies the nineteenth condition or the twentieth condition (step S406).

If the relationship between the amount of coding bits of the region of the object LCU and the amount of coding bits of the region of the same position LCU does not satisfy both the nineteenth condition and the twentieth condition (step S406: NO), the difference determination unit 335 records a determination result indicating that it is determined that there is no difference between the small image of the region of the object LCU and the small image of the region of the same position LCU in the storage unit 337.

If the relationship between the amount of coding bits of the region of the object LCU and the amount of coding bits of the region of the same position LCU satisfies the nineteenth condition or the twentieth condition (step S406: YES), the difference determination unit 335 records a determination result indicating that it is determined that there is a difference between a small image of a region of the object LCU and a small image of a region of the same position LCU in the storage unit 337. In the third embodiment, the difference determination unit 335 determines that a reference image for which it is determined that there is a difference between a small image of the object image and a small image of the reference image is a reference image having a difference from the object image and records it in the storage unit 337 (step S407). The operations of steps S405 to S407 are performed for each region (object LCU) of the object image.

The sorting unit 336 determines whether or not the object image satisfies the quality standard on the basis of a result of comparison between the number of reference images determined to have differences and the number of reference images determined not to have a difference. The sorting unit 336 sorts a plurality of images in accordance with whether or not the object image satisfies the quality standard (step S408). The removal unit 338 removes, on the basis of the sorting result, an image that does not satisfy the quality standard desired by the user from the time-series images recorded in the database 320 (step S409).

As described above, the image sorting device 330a of the third embodiment includes a sorting unit 336. The sorting unit 336, as a determination result acquisition unit configured to acquire the determination result, acquires a result of determining the presence or absence of a difference between the object image selected from the plurality of images and the reference images. The sorting unit 336 serving as an evaluation index acquisition unit acquires an evaluation index of each of the time-series images on the basis of at least one of the number of determinations of the presence of the difference between the object image and each reference image and the number of determinations of the absence of the difference between the object image and each reference image. That is, the sorting unit 336 can obtain an evaluation index on the basis of qualities of the time-series images recorded in the database 320.

The sorting unit 336 sorts a plurality of images into an image that satisfies the quality standard and an image that does not satisfy the quality standard on the basis of a result (an evaluation index) of comparing the number of reference images determined to have differences from the object image with the number of reference images determined not to have differences from the object image. If at least one half of images stored in the storage unit 337 satisfy the quality standard related to the imaging object, the sorting unit 336 can detect an image that does not satisfy the quality standard among the time-series images on the basis of the evaluation index obtained as the comparison result. Therefore, the sorting unit 336 can sort an image that satisfies the quality standard from the time-series images on the basis of the evaluation index.

In the conventional technology, there is a problem in that images cannot be classified in accordance with the quality standard desired by the user. According to the above-described sorting, the image sorting device 330a of the third embodiment can sort images in accordance with the quality standard desired by the user. The image sorting device 330a of the third embodiment can accurately sort images because images are classified using a plurality of images instead of analyzing a single image.

One of the features of the image sorting device 330a serving as an image evaluation device is to obtain evaluation indices based on differences between images with respect to a plurality of time-series images stored in the database 320. According to a process based on a difference between images, the image sorting device 330a can obtain a consistent evaluation index even if the number of stored images increases. Further, the image sorting device 330a can perform sorting according to the quality standard on the time-series images on the basis of the obtained evaluation index.

Fourth Embodiment

A fourth embodiment is different from the third embodiment in that a difference determination unit 335 determines the presence or absence of a difference between images on the basis of an area of a small image of a region within an image. In the fourth embodiment, only differences from the third embodiment will be described.

Figure 15:
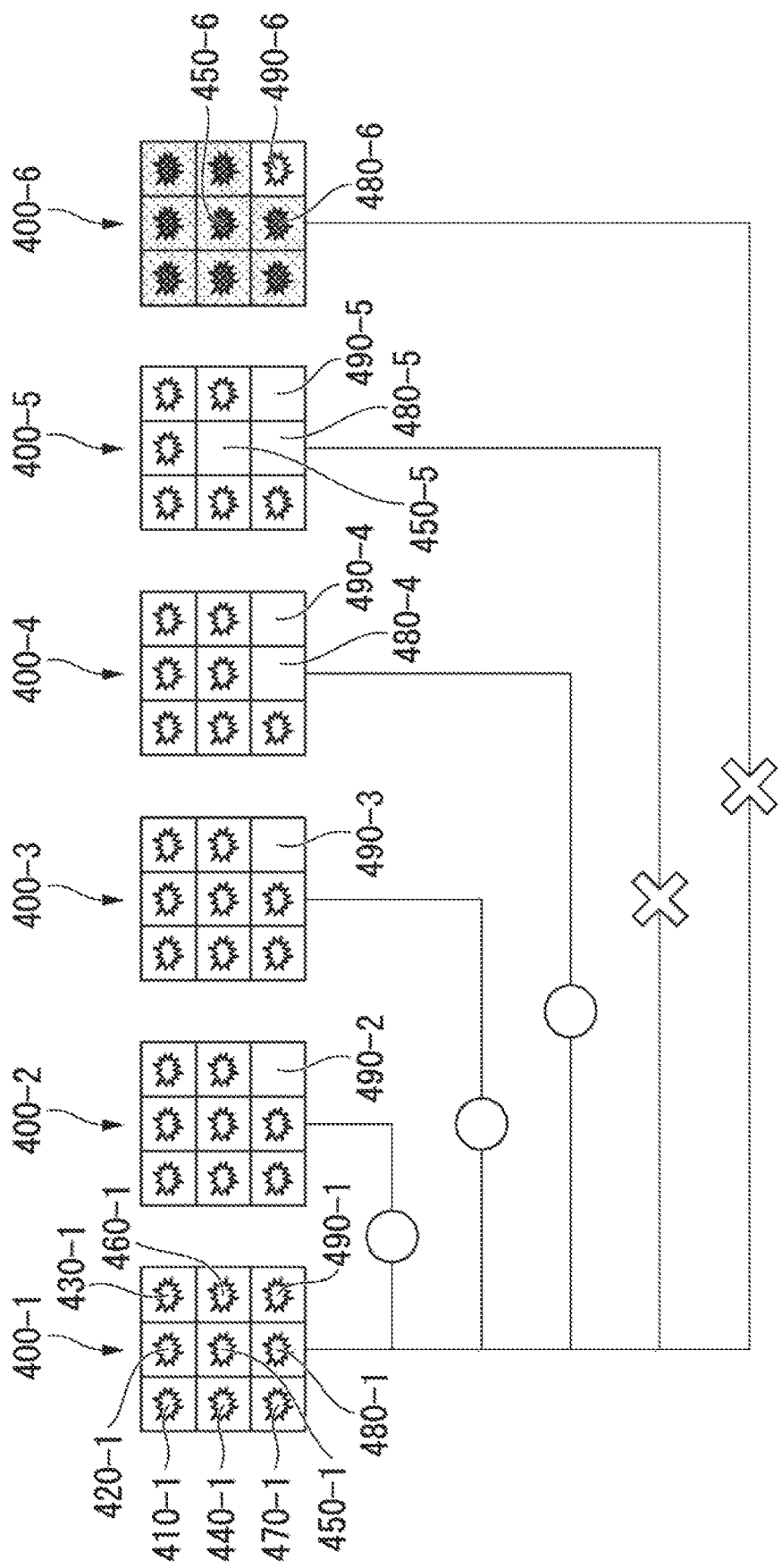
FIG. 15 is a diagram showing a first example of a determination of the presence or absence of a difference between images according to a fourth embodiment.

FIG. 15 is a diagram showing a first example of the determination of the presence or absence of a difference between images in the fourth embodiment. Images 400-1 to 400-6 are time-series images. Each image 400 is divided into 3×3 (=9) regions 410 to 490. Areas of small images of the regions 410 to 490 are the same in the image 400.

The difference determination unit 335 selects images serving as object images one by one from the images 400-1 to 400-6. In the example shown in FIG. 15, the image 400-1 is an object image. The images 400-2 to 400-6 are reference images.

The difference determination unit 335 determines whether or not there is a difference between a small image of a region of an object LCU and a small image of a region of the same position LCU. For example, the difference determination unit 335 determines that there is a difference between a small image of a region 490-1 of the object LCU and a small image of a region 490-2 of the same position LCU. If the number of time-series images is 6, the difference determination unit 335 determines a difference between time-series images 15 (=6×(6−1)/2) times.

Between the image 400-1 and the image 400-2, the difference determination unit 335 determines that there is a difference between the small image of the region 490-1 and the small image of the region 490-2. The ratio of a total area of small images of regions of the image 400-2 having differences from those of the image 400-1 to the area of the image 400-2 is (1/9). That is, the ratio of the number of small images of regions of the image 400-2 having differences from those of the image 400-1 to the total number of small images of the regions of the image 400-2 is (1/9). Because the region and small image correspond one-to-one, the number of small images of regions is equal to the number of regions.

Between the image 400-1 and the image 400-3, the difference determination unit 335 determines that there is a difference between the small image of the region 490-1 and the small image of the region 490-3. The ratio of a total area of small images of regions of the image 400-3 having differences from those of the image 400-1 to the area of the image 400-3 is (1/9). That is, the ratio of the number of small images of regions of the image 400-3 having differences from those of the image 400-1 to the total number of small images of the regions of the image 400-3 is (1/9).

Between the image 400-1 and the image 400-4, the difference determination unit 335 determines that there is a difference between the small image of the region 480-1 and the small image of the region 480-4. The difference determination unit 335 determines that there is a difference between the small image of the region 490-1 and the small image of the region 490-4. The ratio of a total area of small images of regions of the image 400-4 having differences from those of the image 400-1 to the area of the image 400-4 is (2/9). That is, the ratio of the number of small images of regions of the image 400-3 having differences from those of the image 400-1 to the total number of small images of the regions of the image 400-3 is (2/9).

Between the image 400-1 and the image 400-5, the difference determination unit 335 determines that there is a difference between the small image of the region 450-1 and the small image of the region 450-5. The difference determination unit 335 determines that there is a difference between the small image of the region 480-1 and the small image of the region 480-5. The difference determination unit 335 determines that there is a difference between the small image of the region 490-1 and the small image of the region 490-5. The ratio of a total area of small images of regions of the image 400-5 having differences from the image 400-1 to the area of the image 400-5 is (3/9). That is, the ratio of the number of small images of regions of the image 400-5 having differences from those of the image 400-1 to the total number of small images of the regions of the image 400-5 is (3/9).

Between the image 400-1 and the image 400-6, the difference determination unit 335 determines that there is no difference between the small image of the region 490-1 and the small image of the region 490-6. The ratio of a total area of small images of regions of the image 400-6 having differences from those of the image 400-1 to the area of the image 400-6 is (8/9). That is, the ratio of the number of small images of the regions of the image 400-6 having differences from those of the image 400-1 to the total number of small images of the regions of the image 400-6 is (8/9).

The difference determination unit 335 determines a reference image determined to have a difference from the object image in an area having a fixed proportion (a fourth threshold value) or more within the reference image as the reference image having a difference from the object image. When the fixed proportion is (3/9), the difference determination unit 335 determines that there is no difference between the image 400-1 selected as the object image and each of the images 400-2 to 400-4 that are the reference images. The difference determination unit 335 determines that there are differences between the image 400-1 selected as the object image and each of the images 400-5 and 400-6 that are the reference images.

The sorting unit 336 calculates a ratio (2/5) of the number of reference images having differences from the object image to the total number of reference images among the time-series images as a comparison result. The sorting unit 336 determines whether or not the calculated ratio is greater than or equal to the third threshold value on the basis of a magnitude relationship shown in Equation (1). If the third threshold value is (1/2), the sorting unit 336 determines the image 400-1 for which a value (a ratio) of the left side of Equation (1) is less than the third threshold value as an image that satisfies the quality standard desired by the user (a clear image).

Figure 16:
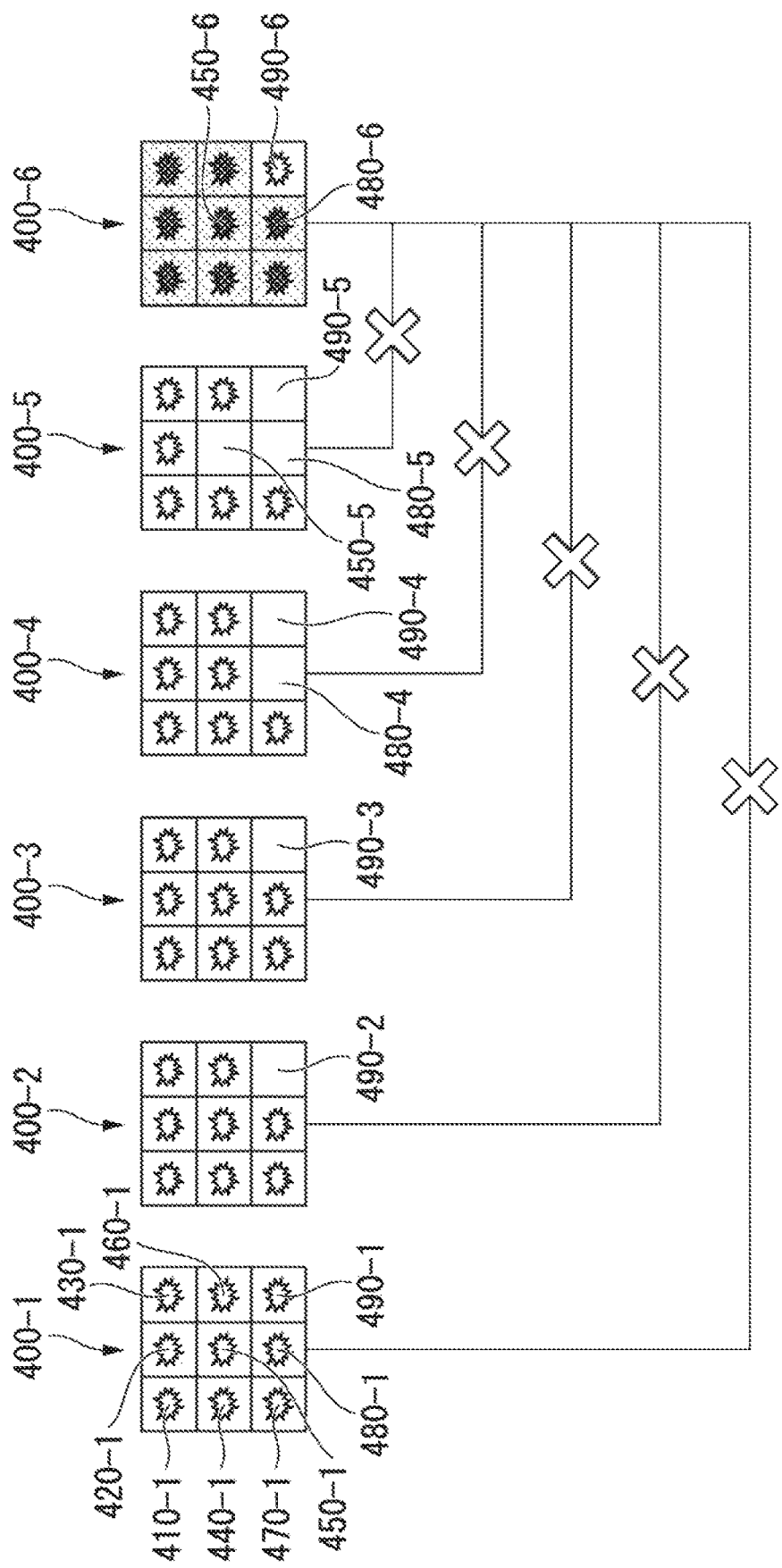
FIG. 16 is a diagram showing a second example of a determination of the presence or absence of a difference between images according to the fourth embodiment.

FIG. 16 is a diagram showing a second example of the determination of the presence or absence of a difference between images according to the fourth embodiment.

In FIG. 16, the image 400-6 is an object image. The images 400-1 to 400-5 are reference images. The difference determination unit 335 determines whether or not there is a difference between a small image of a region of an object LCU and a small image of a region of the same position LCU. For example, the difference determination unit 335 determines that there is a difference between a small image of a region 490-6 of the object LCU and a small image of a region 490-5 of the same position LCU.

Between the image 400-6 and the image 400-1, the difference determination unit 335 determines that there is no difference between the small image of the region 490-6 and the small image of the region 490-1. The ratio of a total area of small images of regions of the image 400-1 having differences from those of the image 400-6 to the area of the image 400-1 is (8/9).

Between the image 400-6 and the image 400-2, a ratio of a total area of small images of regions of the image 400-2 having differences from those of the image 400-6 to the area of the image 400-2 is (9/9). With respect to the images 400-3 to 400-5, the ratio of a total area of small images of regions having differences to an area of each of the images 400-3 to 400-5 is (9/9) as in the image 400-2.

The difference determination unit 335 determines a reference image determined to have a difference from the object image in an area having a fixed proportion (a fourth threshold value) or more within the reference image as the reference image having a difference from the object image. When the fixed proportion is (3/9), the difference determination unit 335 determines that there is a difference between the image 400-6 selected as the object image and each of the images 400-1 to 400-5 that are reference images.

The sorting unit 336 calculates a ratio (5/5) of the number of reference images having differences from the object image to the total number of reference images among the time-series images as a comparison result. The sorting unit 336 determines whether or not the calculated ratio is greater than or equal to the third threshold value on the basis of a magnitude relationship shown in Equation (1). If the third threshold value is (1/2), the sorting unit 336 determines the image 400-6 for which the value (the ratio) of the left side of Equation (1) is greater than or equal to the third threshold value as an image that does not satisfy the quality standard desired by the user. For example, if an imaging object clearly appears in the majority of the time-series images stored in the database 320, the sorting unit 336 determines the image 400-6 as an unclear image that does not satisfy the quality standard related to the imaging object.

Figure 17:
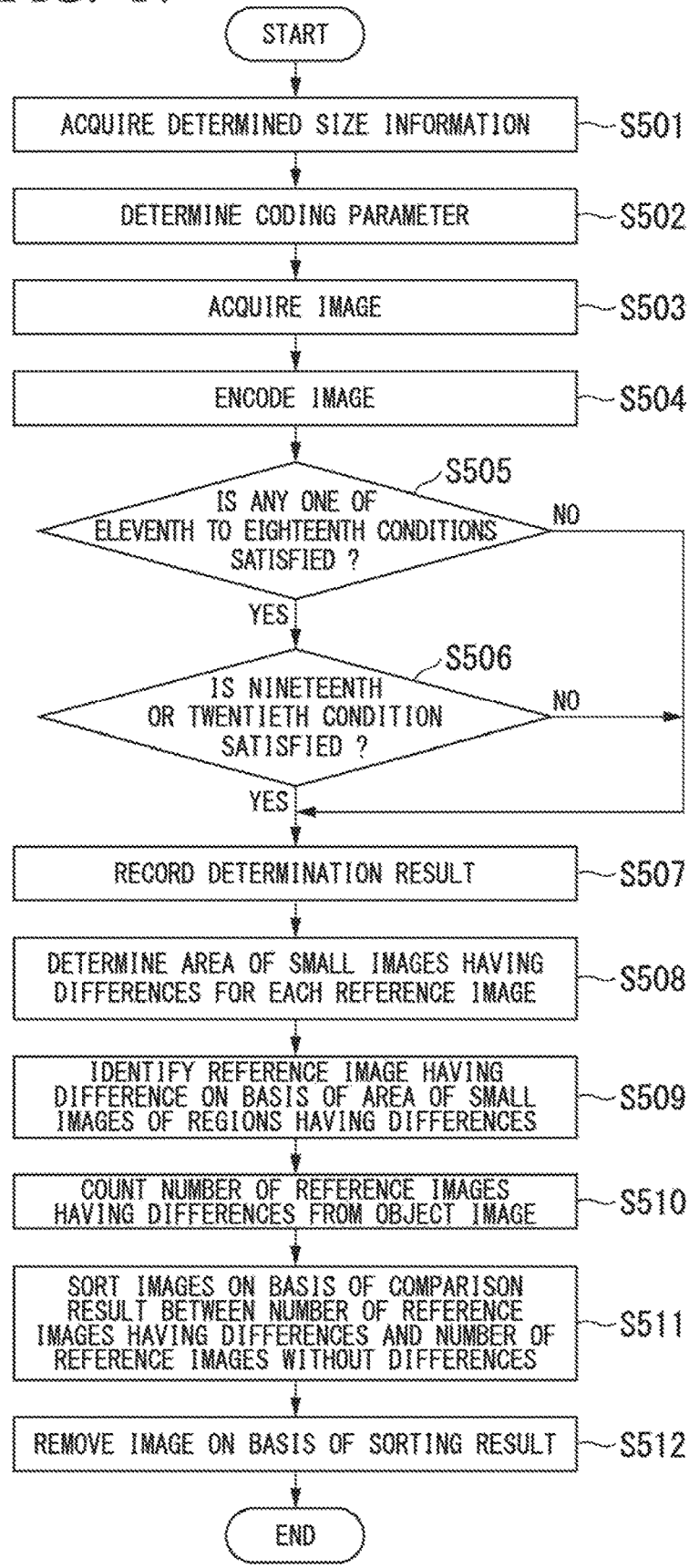
FIG. 17 is a flowchart showing an example of an operation of an image sorting system according to the fourth embodiment.

FIG. 17 is a flowchart showing an example of an operation of an image sorting system according to the fourth embodiment. The operations of steps S501 to S507 are similar to the operations of steps S401 to S407 of FIG. 14.

The difference determination unit 335 detects an area of the small images of the regions of the object LCU having differences from the regions of the same position LCUs for each reference image (step S508). The difference determination unit 335 determines the reference image determined to have a difference from the object image in an area of a predetermined ratio or more in the reference image as the reference image having the difference from the object image (step S509). The difference determination unit 335 counts the number of reference images having differences from the object image (step S510).

The operations of steps S511 and S512 are similar to the operations of steps S408 and S409 in FIG. 4.

As described above, the difference determination unit 335 of the fourth embodiment determines a reference image determined to have a difference from the object image in an area of a predetermined ratio or more to the area of the reference image as a reference image having a difference from the object image. Thereby, the image sorting device 330a of the fourth embodiment can more accurately sort images according to the quality standard desired by the user.

Fifth Embodiment

A fifth embodiment is different from the third and fourth embodiments in that a sorting unit 336 sorts images in accordance with an area of small images of regions having differences between small images. In the fifth embodiment, only differences from the third and fourth embodiments will be described.

A difference determination unit 335 determines the total area of small images of regions of a reference image determined to have differences from small images of regions within an object image among time-series images. The sorting unit 336 sorts images on the basis of a ratio of the total area of the small images of the regions within the reference image determined to have the differences from the small images of the regions within the object image to a total area of the reference image among the time-series images. The sorting unit 336 may sort images on the basis of the ratio of the number of regions within the reference image including small images determined to have differences from small images of the regions within the object image to the total number of regions within the reference image among the time-series images.

An example of a determination in the fifth embodiment will be described with reference to FIG. 16. The number of small images of regions of an image 400-1 having differences from those of an image 400-6 is eight. The number of small images of regions of an image 400-2 having differences from those of the image 400-6 is nine. The number of small images of regions of an image 400-3 having differences from those of the image 400-6 is nine. The number of small images of regions of an image 400-4 having differences from those of the image 400-6 is nine. The number of small images of regions of an image 400-5 having differences from those of the image 400-6 is nine. Therefore, the total number of small images of regions of the reference images having differences from small images of regions of the image 400-6 that is the object image among the time-series images is 44 in total.

The sorting unit 336 determines an object image for which the total number of small images of regions of reference images having differences from small images of regions of the object image among the time-series images is greater than or equal to a threshold value as an image that does not satisfy the quality standard desired by the user (an unclear image). In the example shown in FIG. 16, the sorting unit 336 determines the image 400-6 for which the total number of small images (44) of regions of the images 400-1 to 400-5 having differences from small images of regions of the image 400-6 is greater than or equal to a fifth threshold value (23) as an image that does not satisfy the quality standard desired by the user (an unclear image). The fifth threshold value may be determined on the basis of one half of the total number of regions of the reference images.

The sorting unit 336 may determine whether or not the image satisfies the quality standard desired by the user as follows.

The ratio of the number of small images of the regions of the reference images having differences from the small images of the regions of the object image to the total number of reference images among the time-series images is (44/45). That is, the ratio of a total area of the small images of the regions of the reference images having differences from the small images of the regions of the object image to the total area of the reference images among the time-series images is (44/45).

The sorting unit 336 determines an object image for which a ratio of a total area of small images of regions of reference images having differences from small images of regions of the object image to a total area of the reference images among the time-series images is greater than or equal to a threshold value as an image that does not satisfy the quality standard desired by the user. In the example shown in FIG. 16, the sorting unit 336 may determine the image 400-6 for which a ratio (44/45) of a total area of small images of regions of the images 400-1 to 400-5 having differences from small images of regions of the image 400-6 to a total area (45) of the reference images among the time-series images is greater than or equal to a sixth threshold value (1/2) as an image that does not satisfy the quality standard desired by the user.

Figure 18:
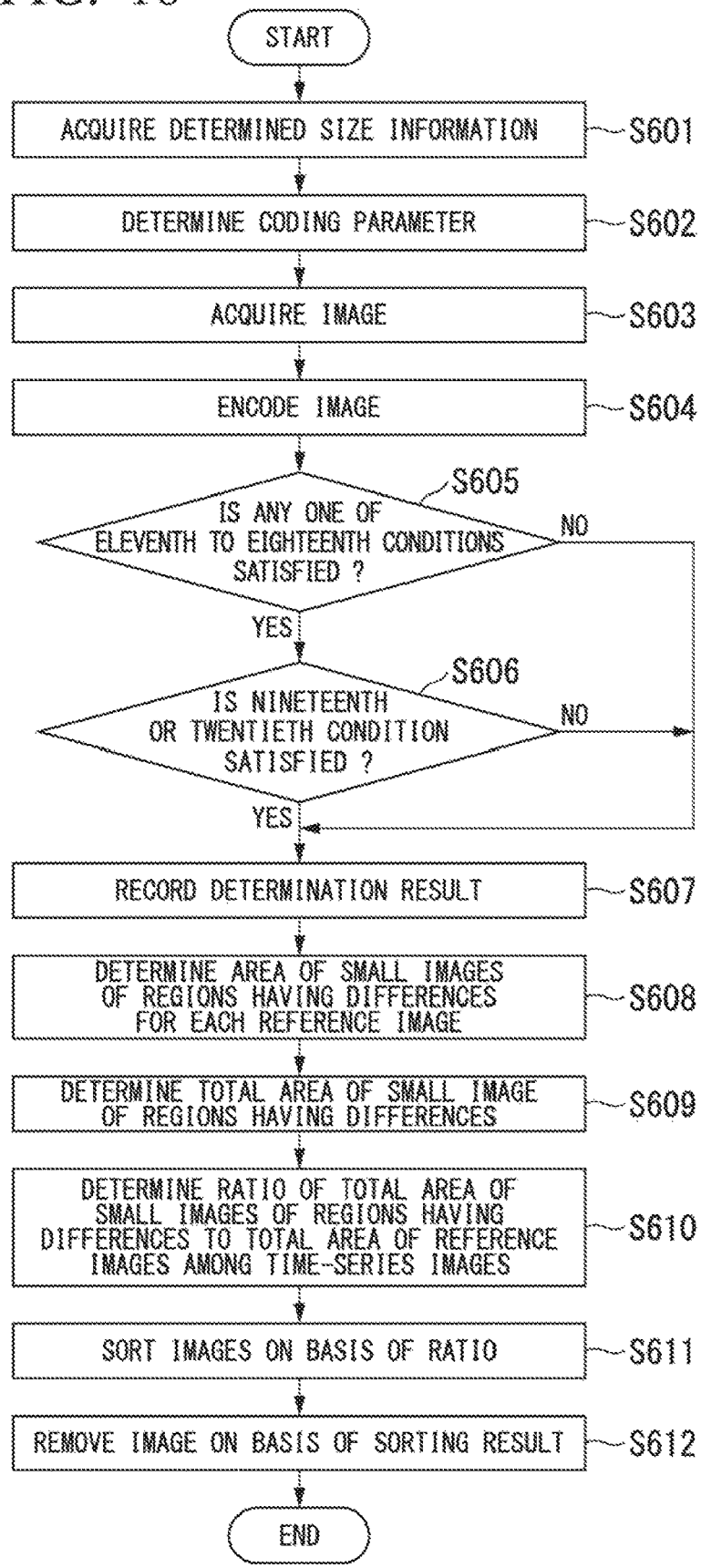
FIG. 18 is a flowchart showing an example of an operation of an image sorting system according to a fifth embodiment.

FIG. 18 is a flowchart showing an example of an operation of an image sorting system 301 in the fifth embodiment. The operations of steps S601 to S608 are similar to the operations of steps S501 to S508 of FIG. 17.

The difference determination unit 335 detects a total area of small images of regions within references images determined to have differences from small images of regions within the object image among the time-series images (step S609). The sorting unit 336 determines the ratio of the total area of the small images of the regions within the references images determined to have the differences from the small images of the regions within the object image to a total area of the reference images among the time-series images (step S610). The sorting unit 336 sorts the images on the basis of the ratio of the total area of the small images (step S611). The operation of step S612 is similar to the operation of step S512 of FIG. 17.

As described above, the sorting unit 336 of the fifth embodiment determines that a reference image has a difference from an object image on the basis of a ratio of a total area of small images of regions within reference images determined to have differences from small images of regions within the object image to the total area of the reference images among a plurality of images. Thereby, the image sorting device 330a of the fifth embodiment can sort images in accordance with the quality standard desired by the user.

Sixth Embodiment

A sixth embodiment is different from the third to fifth embodiments in that a new image is added to time-series images stored in a database 320. In the sixth embodiment, only differences from the third to fifth embodiments will be described.

Figure 19:
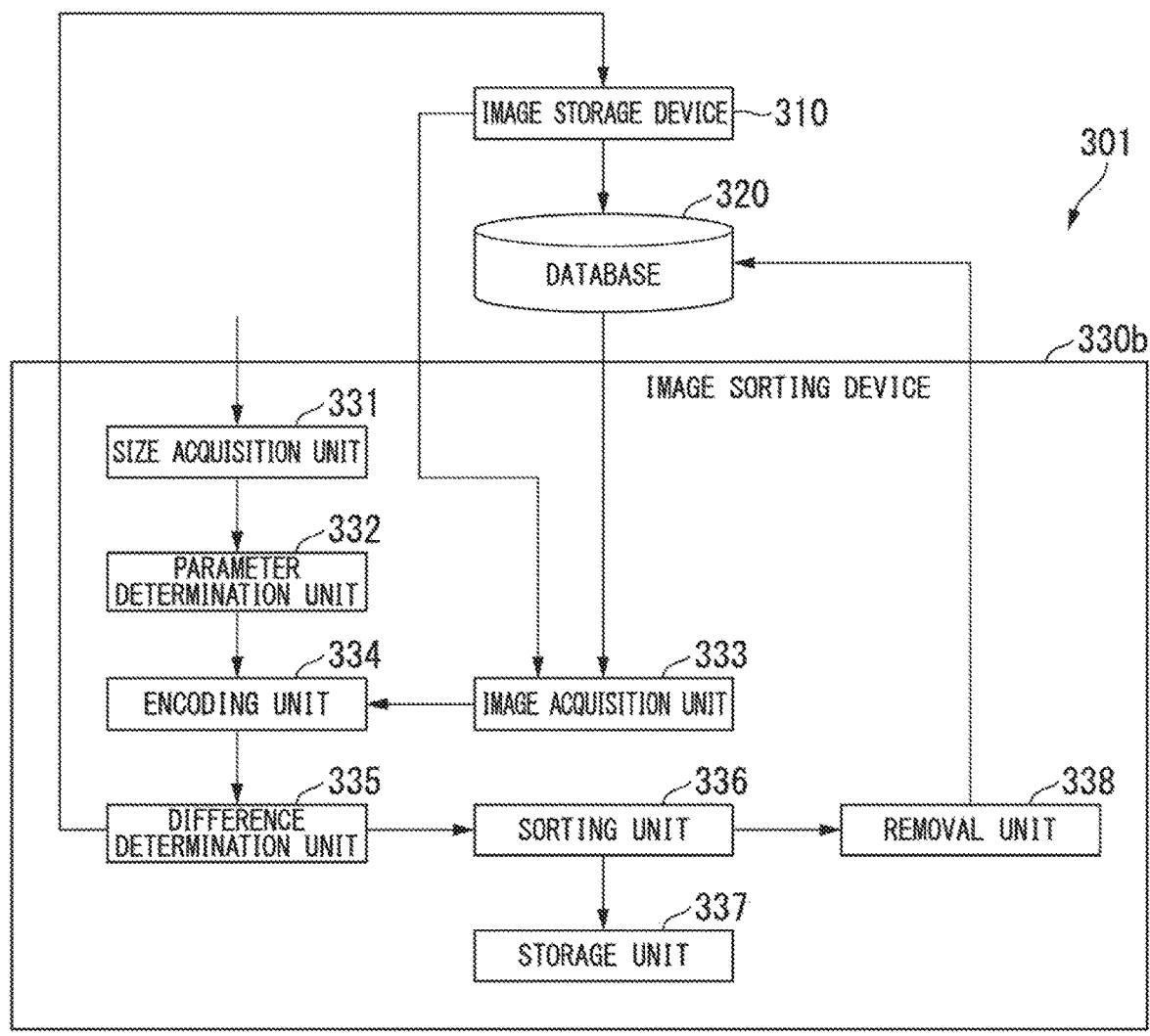
FIG. 19 is a diagram showing an example of a configuration of an image sorting system according to a sixth embodiment.

FIG. 19 is a diagram showing an example of a configuration of the image sorting system 301 according to the sixth embodiment. An image sorting system 301 includes an image storage device 310, a database 320, and an image sorting device 330b serving as an image evaluation device. The image storage device 310 transmits a new image intended to be recorded in the database 320 to the image sorting device 330b. The image storage device 310 acquires information indicating whether or not a new image satisfies a quality standard from the image sorting device 330b. The image storage device 310 records a new image in the database 320 when the new image satisfies the quality standard desired by a user.

An image acquisition unit 333 acquires a new image that is not included in the time-series images stored in the database 320 from the image storage device 310.

A difference determination unit 335 selects an image suitable as a reference image for determining the presence or absence of a difference from the new image to be recorded in the database 320 by the image storage device 310 from the time-series images stored in the database 320.

An image suitable as a reference image for determining the presence or absence of a difference is, for example, a standard image among the time-series images stored in the database 320. An example of the standard image is determined to have a smallest difference from other images among the time-series images stored in the database 320. The image suitable as the reference image for determining the presence or absence of a difference may have the largest difference from an image that does not satisfy the quality standard desired by the user.

An operation example of the difference determination unit 335 according to the sixth embodiment will be described with reference to FIG. 15. In the example shown in FIG. 15, since the image 400-6 that does not satisfy the quality standard desired by the user is removed from the time-series images, the database 320 stores images 400-1 to 400-5 as the time-series images.

The difference determination unit 335 selects an image suitable as a reference image for determining the presence or absence of differences from a new image from the images 400-1 to 400-5 that satisfy the quality standard desired by the user. In the example shown in FIG. 15, the difference determination unit 335 determines that there are differences between the image 400-1 and the other images 400 in small images of a total of seven regions. The difference determination unit 335 determines that there are differences between the image 400-2 and the other images 400 in small images of a total of four regions. The difference determination unit 335 determines that there are differences between the image 400-3 and the other images 400 in small images of a total of four regions. The difference determination unit 335 determines that there are differences between the image 400-4 and the other images 400 in small images of a total of five regions.

Therefore, the difference determination unit 335 selects the image 400-2 and the image 400-3 determined to have the smallest difference from the other images among the time-series images as reference images. The difference determination unit 335 may select either the image 400-2 or the image 400-3 on the basis of a predetermined condition. The predetermined condition is, for example, a condition that an image with a later imaging clock time is selected.

The difference determination unit 335 obtains a new image intended to be recorded in the database 320 by the image storage device 310 from the image storage device 310 via the image acquisition unit 333. The difference determination unit 335 determines the presence or absence of a difference between the new image acquired from the image storage device 310 and the selected reference image. If the difference determination unit 335 determines that there is no difference between the new image acquired from the image storage device 310 and the selected reference image, the difference determination unit 335 determines that the new image satisfies the quality standard. The difference determination unit 335 transmits information indicating whether or not the new image satisfies the quality standard to the image storage device 310.

Figure 20:
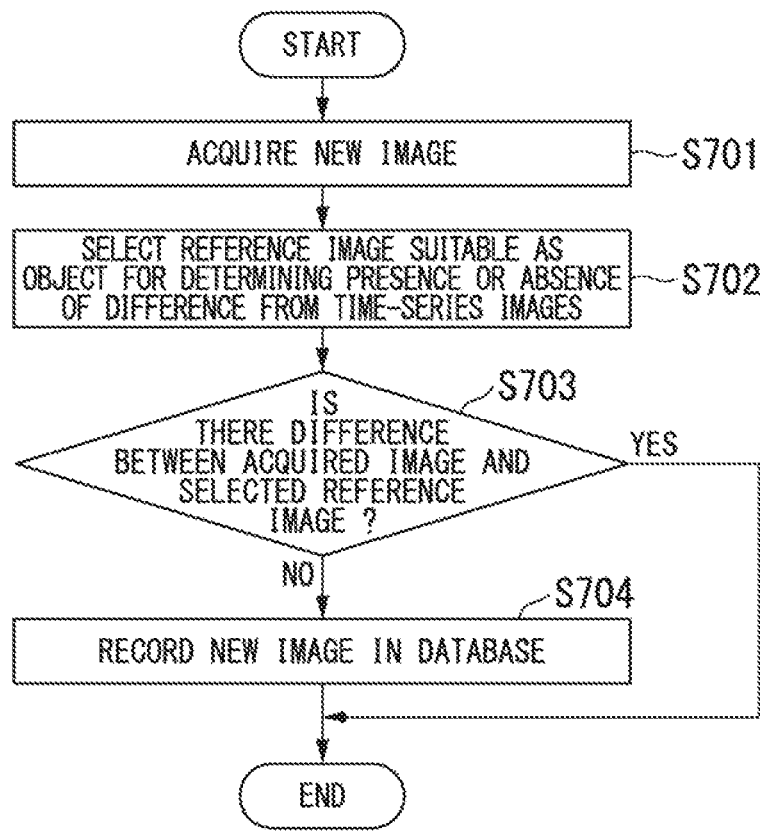
FIG. 20 is a flowchart showing an example of an operation of the image sorting system according to the sixth embodiment.

FIG. 20 is a flowchart showing an example of the operation of the image sorting system 301 according to the sixth embodiment. The image acquisition unit 333 acquires a new image that is not included in the time-series images stored in the database 320 from the image storage device 310 (step S701). The difference determination unit 335 selects an image suitable as a reference image for determining the presence or absence of a difference from the new image intended to be recorded in the database 320 by the image storage device 310 from the time-series images stored in the database 320 (step S702).

The difference determination unit 335 determines the presence or absence of a difference between the new image acquired from the image storage device 310 and the selected reference image (step S703). If it is determined that there is no difference between the new image acquired from the image storage device 310 and the selected reference image (step S703: NO), the image storage device 310 records the new image in the database 320 (step S704). If it is determined that there is a difference between the new image acquired from the image storage device 310 and the selected reference image (step S703: YES), the image sorting device 330*b* ends the process.

As described above, the difference determination unit 335 of the sixth embodiment includes a new image determined not to have a difference from the reference image selected from the time-series images of the database 320 in the time-series images of the database 320. Thereby, the image sorting device 330*b* of the sixth embodiment can efficiently determine whether or not to include a newly captured image in the time-series images of the database 320. The image sorting device 330*b* of the sixth embodiment can minimize an increase in the number of times that images required for a determination of whether or not to record a new image in the database 320 are compared because the difference determination unit 335 determines the presence or absence of a difference between a reference image selected from time-series images and the new image.

Also, some functions of the evaluation support device or the image sorting device serving as the image evaluation device in the above-described embodiments may be configured to be implemented by a computer. In this case, the functions may be implemented by recording a program for implementing the functions on a computer-readable recording medium and causing a computer system to read and execute the program recorded on the recording medium. Also, the "computer system" described here is assumed to include an operating system (OS) and hardware such as peripheral devices. Also, the "computer-readable recording medium" refers to a storage device including a flexible disk, a magneto-optical disc, a read only memory (ROM), a portable medium such as a compact disc (CD)-ROM, and a hard disk embedded in the computer system. Further, the "computer-readable recording medium" may include a computer-readable recording medium for dynamically holding a program for a short time as in a communication line when the program is transmitted via a network such as the Internet or a communication circuit such as a telephone circuit and a computer-readable recording medium for holding the program for a predetermined time as in a volatile memory inside the computer system including a server and a client when the program is transmitted. The above-described program may be used to implement some of the above-described functions. Further, the program may implement the above-described functions in combination with a program already recorded on the computer system and implement the above-described functions using a programmable logic device such as a field programmable gate array (FPGA).

Although the embodiments of the present invention have been described above in detail with reference to the drawings, the specific configuration is not limited to the embodiments and designs and the like may also be included without departing from the scope of the present invention.

For example, a change detection method and a method of detecting the presence or absence of differences between small images to be used to perform the present invention are not limited to methods described in the above-described embodiments, and may be a conventional method such as a method based on comparison or machine learning of image feature quantities, pixel values, or brightness values.

INDUSTRIAL APPLICABILITY

The present invention can be applied to fields required to obtain an evaluation index based on qualities of a plurality of images that are stored.

REFERENCE SIGNS LIST

1 Evaluation support system
10 Database
20*a* Evaluation support device
20*b* Evaluation support device
21 Size acquisition unit
22 Parameter determination unit
23 Image acquisition unit
24 Encoding unit
25 Difference determination unit
26 Evaluation index unit
27 Image processing unit
28 Storage unit
29 Binarization unit
30 Display device
100 Image
110 Region
111 Index display field image
120 Region
120*a* Region-enlarged image
121 Index display field image
122 Name display field image
130 Region
130*a* Region-enlarged image
131 Index display field image
132 Name display field image
140 Map image
301 Image sorting system
310 Image storage device
320 Database
330*a* Image sorting device
330*b* Image sorting device
331 Size acquisition unit
332 Parameter determination unit
333 Image acquisition unit 334 Encoding unit
335 Difference determination unit
336 Sorting unit
337 Storage unit
338 Removal unit
400 Image
410 Region
420 Region
430 Region
440 Region
450 Region
460 Region
470 Region
480 Region
490 Region

The invention claimed is:

1. An image evaluation device, comprising:
a processor; and
a non-transitory storage medium having computer program instructions stored thereon, when executed by the processor, perform to:
a determination result acquisition unit configured to acquire a determination result of determining a presence or absence of a difference between an object image that is one of a plurality of images that include three or more images obtained by imaging substantially the same spatial region and each of reference images that are images other than the object image among the plurality of images; and
an evaluation index acquisition unit configured to acquire an evaluation index for the plurality of images on the basis of at least one of the number of determinations of the presence of the difference between the object image and each reference image and the number of determinations of the absence of the difference between the object image and each reference image,
wherein the plurality of images are time-series images,
wherein the determination result acquired by the determination result acquisition unit indicates the presence or absence of a difference between a small image of a region within the object image and a small image of a region within the reference image, and
wherein the evaluation index acquisition unit is configured to obtain a result of determining the number of pairs of regions determined to have a difference between small images among each pair of a region within the object image and a region within each image of the time-series images other than the object image as the evaluation index.

2. The image evaluation device according to claim 1, wherein, if a probability that the presence or absence of a difference between the small images is erroneously determined is less than a first threshold value, the evaluation index acquisition unit is configured to obtain a value indicating a priority for evaluating the difference as the evaluation index.

3. The image evaluation device according to claim 2, further comprising a binarization unit configured to obtain a binary evaluation index indicating the presence or absence of the difference between the small images on the basis of a result of comparing a value according to the evaluation index with a second threshold value.

4. The image evaluation device according to claim 1, wherein, if a probability that the presence or absence of a difference between the small images is erroneously determined is greater than or equal to a first threshold value, the evaluation index acquisition unit is configured to obtain a value indicating accuracy of a result of determining that the difference between the small images is present as the evaluation index.

5. The image evaluation device according to claim 1, further comprising a difference determination unit configured to determine the presence or absence of the difference between the small image of the region within the object image and the small image of the region within the reference image and obtain the determination result.

6. The image evaluation device according to claim 1, further comprising an image processing unit configured to enlarge the small image of the region within the object image on the basis of the evaluation index obtained for each region within the object image.

7. The image evaluation device according to claim 1, wherein the evaluation index acquisition unit is configured to sort the plurality of images into images that satisfy a quality standard related to the spatial region and images that do not satisfy the quality standard on the basis of the evaluation index.

8. The image evaluation device according to claim 7, wherein the evaluation index acquisition unit is configured to acquire a ratio of the number of reference images determined to have differences from the object image to the total number of reference images among the plurality of images as the evaluation index.

9. The image evaluation device according to claim 8, further comprising a removal unit configured to remove the object image that does not satisfy the quality standard from the plurality of images on the basis of a magnitude relationship between the evaluation index and a threshold value.

10. The image evaluation device according to claim 7, wherein the evaluation index acquisition unit is configured to acquire as the evaluation index either: a first ratio or a second ratio,
wherein the first ratio being a ratio of a total area of small images of regions within the reference images determined to have differences from small images of regions within the object image to a total area of the reference images among the plurality of images, and
the second ratio being a ratio of the number of regions within the reference images including the small images determined to have the differences from the small images of the regions within the object image to the total number of regions within the reference images among the plurality of images.

11. The image evaluation device according to claim 7, further comprising a difference determination unit configured to determine the presence or absence of the difference between the object image and each reference image.

12. The image evaluation device according to claim 11, wherein the difference determination unit is configured to determine the reference image determined to have the difference from the object image in an area having a fixed proportion or more with respect to an area of the reference image as the reference image having the difference from the object image.

13. The image evaluation device according to claim 11, wherein the difference determination unit is configured to add another image determined not to have a difference from an image selected from the plurality of images in the plurality of images.

14. An image evaluation method, comprising the steps of:
acquiring a result of determining a presence or absence of a difference between an object image that is one of a plurality of images that include three or more images obtained by imaging substantially the same spatial region and each of reference images that are images other than the object image among the plurality of images; and acquiring an evaluation index for the plurality of images on the basis of at least one of the number of determinations of the presence of the difference between the object image and each reference image and the number of determinations of the absence of the difference between the object image and each reference image, wherein the plurality of images are time-series images, wherein the determination result acquired by the acquiring of the result of determining indicates the presence or absence of a difference between a small image of a region within the object image and a small image of a region within the reference image, and wherein, in the acquiring of the evaluation index, a result of determining the number of pairs of regions determined to have a difference between small images among each pair of a region within the object image and a region within each image of the time-series images other than the object image, is obtained as the evaluation index.

15. A non-transitory computer-readable medium storing an image evaluation program for causing a computer provided in an image evaluation device to function as:

a determination result acquisition unit configured to acquire a result of determining a presence or absence of a difference between an object image that is one of a plurality of images that include three or more images obtained by imaging substantially the same spatial region and each of reference images that are images other than the object image among the plurality of images; and an evaluation index acquisition unit configured to acquire an evaluation index for the plurality of images on the basis of at least one of the number of determinations of the presence of the difference between the object image and each reference image and the number of determinations of the absence of the difference between the object image and each reference image, wherein the plurality of images are time-series images, wherein the determination result acquired by the determination result acquisition unit indicates the presence or absence of a difference between a small image of a region within the object image and a small image of a region within the reference image, and wherein the evaluation index acquisition unit is configured to obtain a result of determining the number of pairs of regions determined to have a difference between small images among each pair of a region within the object image and a region within each image of the time-series images other than the object image as the evaluation index.

* * * * *